US010235727B2

(12) United States Patent
Kapoor

(10) Patent No.: US 10,235,727 B2
(45) Date of Patent: Mar. 19, 2019

(54) LEARNING FACILITY MANAGEMENT IN A MODULAR LEARNING SYSTEM

(75) Inventor: Samridh Kapoor, Mumbai (IN)

(73) Assignees: Monk Akarshala Design Private Limited, Mumbai (IN); Monk Akarshala Inc., Sacramento, CA (US)

( * ) Notice: Subject to any disclaimer, the term of this patent is extended or adjusted under 35 U.S.C. 154(b) by 738 days.

(21) Appl. No.: 14/344,485

(22) PCT Filed: Sep. 12, 2012

(86) PCT No.: PCT/US2012/054694
§ 371 (c)(1),
(2), (4) Date: Mar. 12, 2014

(87) PCT Pub. No.: WO2013/039931
PCT Pub. Date: Mar. 21, 2013

(65) Prior Publication Data
US 2015/0012454 A1    Jan. 8, 2015

(30) Foreign Application Priority Data

Sep. 13, 2011 (IN) .................. 2591/MUM/2011

(51) Int. Cl.
*G06Q 50/20* (2012.01)
*G09B 7/00* (2006.01)
*G06Q 30/06* (2012.01)
*G09B 5/00* (2006.01)

(52) U.S. Cl.
CPC ....... *G06Q 50/205* (2013.01); *G06Q 30/0633* (2013.01); *G09B 5/00* (2013.01); *G09B 7/00* (2013.01)

(58) Field of Classification Search
CPC .................. G06Q 50/205; G06Q 30/0633
USPC ........................................................ 707/609
See application file for complete search history.

(56) References Cited

U.S. PATENT DOCUMENTS

| 6,587,668 | B1 | 6/2003 | Miller et al. |
| 6,931,387 | B1* | 8/2005 | Wong ............... G06Q 10/04 706/40 |
| 8,171,104 | B2 | 5/2012 | Qi |
| 8,224,757 | B2 | 6/2012 | Bohle |
| 2002/0032762 | A1* | 3/2002 | Price ................ G06F 11/2294 709/223 |
| 2002/0095417 | A1* | 7/2002 | Gordon ............... G06Q 30/02 |
| 2007/0294103 | A1* | 12/2007 | Ahmad .............. G06F 19/327 705/2 |
| 2008/0005025 | A1* | 1/2008 | Legere ............. H04N 7/17318 705/51 |
| 2009/0291426 | A1 | 11/2009 | Polivka |

(Continued)

Primary Examiner — Jensen Hu
(74) Attorney, Agent, or Firm — Nixon Peabody LLP

(57) ABSTRACT

A system and method are disclosed for managing learning facilities in a modular learning system. Information about a plurality of learning facilities, each associated with learning infrastructure, is stored in the modular learning system. Learning applications are also stored in the modular learning system, with each learning application associated with ergonomic requirements. The modular learning system receives a request to set up a learning facility for at least one learning application, and based on the infrastructure and ergonomic requirements determines whether the facility and the at least one learning application are compatible.

5 Claims, 9 Drawing Sheets

(56) References Cited

U.S. PATENT DOCUMENTS

2011/0153357 A1* 6/2011 Zubiller ............... G06Q 20/102
 705/2
2013/0216998 A1* 8/2013 Carrino ................ C12Q 1/6806
 435/5

* cited by examiner

| | |
|---|---|
| Certification Metadata 302 | Scoring Metrics Metadata 304 |
| Language Metadata 306 | Performance Type Metadata 308 |
| Duration Metadata 310 | Subject Link/Tag Metadata 312 |
| Age Level Metadata 314 | Learning Facility Metadata 316 |
| Authoring Metadata 318 | Sequence Metadata 320 |
| Tool Metadata 322 | Mode Metadata 324 |
| Media Metadata 326 | Medium Metadata 328 |
| Job Skill Metadata 330 | Error Metadata 332 |
| Template Metadata 334 | Tutor Metadata 336 |

Learning Application 300

LEARNING FACILITY MANAGEMENT IN A MODULAR LEARNING SYSTEM

CROSS REFERENCE TO RELATED APPLICATIONS

This application is a U.S. National Stage of International Application No. PCT/US2012/054694, titled "Learning Facility Management in a Modular Learning System" filed on 12 Sep. 2012 which claims the benefit of Indian Provisional Specification No. 2591/MUM/2011, titled "Modular Learning Facility Management in a Modular Learning System" filed on 13 Sep. 2011, both of which are incorporated by reference in their entireties.

FIELD OF THE ART

The present disclosure relates generally to modular learning systems, and more particularly to managing learning facilities through a modular learning system.

DESCRIPTION OF THE RELATED ART

The current education environment includes members like students or learners, teachers, tutors, coaches, guides, professors or lecturers, content authors, and organizational members like preschools, schools, colleges, universities, educational boards and professional standards authorities, admission testing authorities, placement organizations, recruiters, HR departments of organizations, educational content and media publishers and local, regional, and national governments. All the above maintain some form of transactional and functional relationships with each other. Conventionally, administrators of preschools, schools, colleges and universities in the current education environment may set up and manage the institutions based on the financial and functional constraints determined by an institutional accreditation authority or determined by an educational board or standards authority to which the institution is affiliated or whose curriculum it follows, or even those constraints determined by the department of education of a local, regional or national government under whose purview the institution is set up. In the case of private and unaffiliated institutions, the institutions may be managed by administrators based on the financial and functional constraints of a board of trustees or equivalent authority under whose purview the institution is established. Such institutions like preschools, schools, colleges and universities in the current education environment may grant regular access only to tutoring individuals like teachers, tutors, coaches, guides, professors or lecturers who are employed or otherwise associated with each such institution; further, such institutions may grant regular access only to students who are admitted to each such institution, with access restricted into other educational institutions and, optionally, to learning infrastructure, to any tutoring individual and student of a particular institution. Because the structure and management of a microlearning facility may differ largely from that of a conventional educational institution in the traditional education environment, modular learning systems may find it difficult to enable educational administrators to manage the microlearning facilities.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a modular learning environment including a modular learning system 144 according to one embodiment.

FIG. 3A is a block diagram of a learning application according to one embodiment.

DETAILED DESCRIPTION

Figure 1:
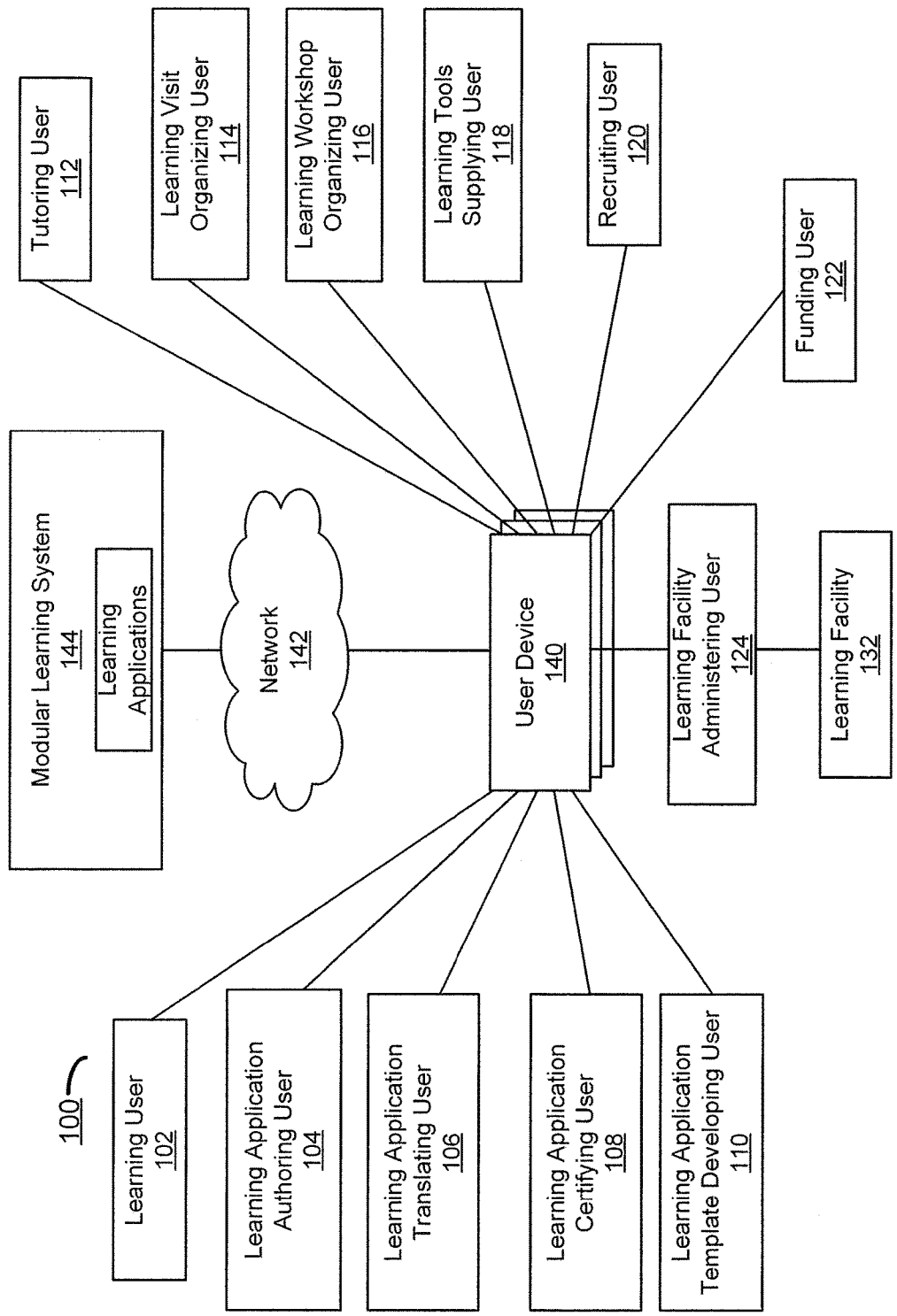

The Figures (FIGS.) and the following description relate to embodiments by way of illustration only. It should be noted that from the following discussion, alternative embodiments of the systems, methods, figures, diagrams and interfaces disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the systems, methods, figures, diagrams and interfaces illustrated herein may be employed without departing from the principles described herein. In the following description, for the purposes of explanation, numerous specific details are set forth in order to provide a thorough understanding of the various embodiments. It will be evident, however to one skilled in the art that the various embodiments may be practiced without these specific details.

Configuration Overview

A system and method to set up a modular learning facility in a modular learning system is provided. A learning user in the modular learning system may want to obtain, in micro increments of time and money, tutoring services from a particular tutoring user 112, learning content applications from another application authoring user 104, learning tools, aids or materials from another learning tools or materials supplying user 118, learning visits from another learning visits organizing user, learning facility access from another, learning facility administering user, learning workshops access from another learning workshop organizing user and may wish to seek placement or recruitment at another organization, registered on the system as a recruiting user.

Furthermore, a system and method for managing learning facility access in a modular learning system environment is provided. A modular learning facility management module in the modular learning system 144 may comprise a plurality of modules and databases such as a learning infrastructure purchase items database, a sale items database, a purchase analytics module, a performance analytics module, an access control module, a sale items compatibility module, a site visit compatibility items database, a learning tool purchase items database, a learning infrastructure recommendation generator, a service availability module, a learning facility availability module, a microlearning sale items database, an ergonomic requirements compatibility database, an access timing module, and a learning facility management interface generator. A method to set up a modular learning facility in a modular learning system environment may comprise a plurality of steps like receiving a learning facility setup request from a learning facility administering user, determining topic/learning applications to be performed at the learning facility, displaying compatible learning infrastructure purchase items with their corresponding price to the administering user, displaying ergonomic requirements to the administering user, determining ergonomic compatibility with learning infrastructure purchase items, scheduling a site visit for a physical check, receiving a site visit compatibility report from the modular learning system, granting a learning infrastructure purchase request, receiving a confirmation of the learning infrastructure setup from the administering user, authorizing access to a restricted learning facility management interface to the administering user, and displaying an updated learning facility availability to a plurality of learning users on the modular learning system. A method for managing learning facility access in a modular learning system may comprise a plurality of steps like receiving a learning application performance request comprising check-in credentials from a learning user, determining service availability for the request, updating the service availability database, receiving a learning infrastructure access request from an authorized user device, determining authorization to access the learning infrastructure, initiating an access timer, processing the application performance, receiving an access timer performance completion report, updating the performance analytics database, updating a learning facility management interface, and displaying the updated learning facility management interface to the learning facility's administering user.

Figure (FIG. 1 is a modular learning environment 100 including a modular learning system 144 according to one embodiment. Modular learning system 144 operates in modular learning environment 100 and communicates with a plurality of user devices 140 over a network 142. The user devices 140 are operated by a plurality of kinds of users in the learning environment. The user devices 140 may comprise any of a variety of computing devices, such as a desktop computer, a laptop, a mobile device, a tablet computer, a set-top box, a kiosk, interactive television, gaming console, and other computing platforms suitable for communicating with modular learning system 144. The modular learning system 144 provides a system for managing curricula, learning facilities, standardized tests, learning applications, tutors, and other modules of a learning experience in micro increments of time and money. The modular learning system 144 enables the various users to communicate with other users in a learning environment and provide services to learning user 102. The network 142 includes a wireless area network, a local area network, a General Packet Radio Service (GPRS) network, an Enhanced Data for Global Evolution (EDGE) network and the like. The user devices 140 are connected to the modular learning system 144 via the network 142.

Modular learning system 144 allows a learning user 102 to manage the purchase and performance of each module of a single microlearning service stack for a learning application (e.g., Breaststroke) or a group of learning applications (e.g., Breaststroke, Freestyle, Butterfly and Swimming Safety). Tutor access, such as access to a swimming instructor may be purchased in various increments, such as in hours. Learning content applications such as a breaststroke application with attached instructional media and other data may be purchased in timed access quantities or may be permanently purchased. Learning facility access such as an Olympic Sized Swimming Pool may be purchased in increments of hours or learning application performances such as ten laps. Learning tools or materials such as Swimming Goggles may be purchased as well. Each of these modules may be separately purchased and interacted with through an interface displayed on user device 140. In case of a learning performance which can be completed on the user device 140 itself, the learning application content is not only purchased and managed, but also performed, through an interface displayed on the user device 140. A learning user 102 may manage the purchase and performance of groups of microlearning performances in the form of learning visits and learning workshops, through an interface displayed on user device 140. Learning user 102 may manage an individual learning identity (or learning profile) and offer details of microlearning application performances completed by the learning user, as well as the personal learning metrics, scores, and reviews. This learning identity may be provided to recruiting users for the purpose of placement.

The modular learning system 144 manages, regulates and supervises the purchase, sale, preview, performance and review of a plurality of microlearning applications, each comprised modularly of a tutoring service, a learning application, learning facility access, and/or learning tools or infrastructure access, a learning visit, and/or a workshop as described in further detail below. The modular learning system 144 manages transactional and functional relationships between users of the modular learning system 144. These various users interact with the modular learning system 144 to modify learning applications and provide learning services as described below.

The modular learning system 144 may enable various other users including but not limited to tutors, authors, tool/material suppliers learning application template developers, translators, certifying user, learning facility administrators, learning event organizers, recruiters, and funders to modularly manage at least one of micro tutoring services associated with specific learning applications, microlearning content applications, microlearning application templates, translation of microlearning content applications, certification of microlearning content applications, access to learning facilities, access to learning workshops, organization of learning visits associated with specific learning applications, supply of tools, aids and/or materials, recruitment services, as well as granular funding services.

The modular learning system 144 enables a tutoring user 112 to provide micro tutoring services to learning user 102. Tutoring user 112 are typically individuals with credentials or other knowledge in the area of learning applications. The tutoring user 112 may associate themselves with particular pieces of content to and may indicate qualifications to teach each learning application, as is described further below. The modular learning system 144 manages the sale of micro tutoring services and associated tutoring user 112 with specific learning applications to learning user 102. Tutoring user 112 assist the learning user 102 with learning the subject matter of the learning application. The tutoring user may provide tutoring to the learning user 102 by meeting the learning user 102 in person to assist the learning user 102 in performing the learning application. As such, the modular learning system 144 facilitates the meeting and communication of tutors and learners. Tutoring user 112 may also provide learning performance data to the modular learning system 144. The learning performance data may indicate, for example, the level of the learner's mastery or proficiency through scoring or other metrics for reviewing performance at a learning performance task. The tutoring user 112 provides input to the modular learning system 144 using a plurality of learning applications through an interface displayed on the tutoring user's 112 user device 140.

The modular learning system 144 enables a learning application authoring user 104 to manage the drafting, editing, testing, publishing, sale and updates of learning content in applications through an interface displayed on user device 140. That is, the learning application authoring user 104 authors individual pieces of learning content which may be purchased and used by a learning user. For example, a learning application authoring user 104 may create instructional content for learning the backstroke. The instructional content may comprise instructions and multimedia, as well as directions for the learning user 102 to practice aspects of the backstroke in a suitable pool. The learning application authoring user 104 may use a pre-existing application template to create the learning application.

The modular learning system 144 enables a learning application template developing user 110 to create learning templates for use in creating learning applications. The learning application templates provide a framework for creating various types of learning applications. For example, learning application templates may comprise a quiz, simulation, role play, experiment, multimedia material, and other types of learning frameworks. The learning application template developing user 110 may manage the development, testing and sale of the learning application templates to learning application authoring users 104 through an interface displayed on a user device 140.

The modular learning system 144 enables a learning application translating user 106 to manage the translation and translation updates of learning content in applications and sale of such services to microlearning content application authors through an interface displayed on a user device 140. The translations are provided to the modular learning system 144 and may be stored with the corresponding learning application to enable providing instructions to learning users 102 in a variety of languages.

The modular learning system 144 enables a learning application certifying user 108 to certify various learning applications according to standards applied by the certifying user 108. Such certifying users may include boards of education at various levels, universities, professional standards groups, and other certification authorities. Certifying users 108 may or may not be formal institutions. For example, a certifying user may include a company establishing a set of learning applications to prepare a candidate for a job with the company. The certifying user 108 manages the certification of each learning content application as a part of their respective curricula or syllabi and manages the sale of such certification services to learning content application authoring users, through an interface displayed on user device 140.

The learning facility 132 facilitates the performance of specific learning applications available on the modular learning system 144. Learning facilities 132 may comprise any location suitable for performing types of learning applications. For example, learning facilities 132 may comprise an athletic club, a chemistry lab, a science lab, a university, a library, or a tutor's home. In some embodiments, the modular learning system 144 enables a facility administering user 124 to determine the compatibility of various learning applications which can be performed within learning facility 132 by picking the learning infrastructure available in the learning facility and associating the learning facility 132 with each learning application (e.g., Breaststroke) compatible with the learning infrastructure (e.g., Olympic sized Swimming Pool). In one embodiment, rather than expressly associating the learning facility with individual learning applications, the learning facility administering user 124 indicates to the modular learning system 144 the specific infrastructures and amenities available at the learning facility 132. In this embodiment, the modular learning system 144 enables a learning user 102 or learning application authoring user 104 to identify a learning facility 132 which is compatible with the learning application based on the infrastructure available at the learning facility 132. The modular learning system 144 may also identify compatible learning facilities based on metadata associated with the learning application and the infrastructure indicated by the learning facility administering user 124.

The learning facilities 132 may comprise a variety of types of learning facilities, such as an independent learning facility, institutional learning facility, workplace learning facility, and temporary learning facility. The modular learning system 144 enables an administrator 124 of an independent learning facility owned, managed or franchised by the modular learning system 144 to manage the sale of learning facility access for performances of specific microlearning applications as well as sale of learning tools and materials (e.g., sulphuric acid or swimming goggles) or access to the same in micro increments of time and money ($6/hour or $5/learning application performance) depending on multiple factors like the learning infrastructure to be accessed (e.g., Swimming Pool, Computers, Chemistry Lab), number of hours of access, and the like, through an interface displayed on a user device 140.

The modular learning system 144 enables an administrator 124 of an institutional learning facility like a preschool, school, college or university (e.g., Bangalore University) associated, partnered or linked with the modular learning system 144 to, in addition to managing the sale associated with the independent learning facility (e.g., learning facility access for performances of specific microlearning applications), manage the learning performances of a plurality of learners (students or outsiders) across a plurality of learning applications available on the system (with the learning user's explicit consent), optionally delegated to a plurality of teachers, professors, lecturers or coaches registered as tutoring users 112 on the modular learning system 144, through an interface displayed on a user device 140.

The modular learning system 144 enables an administrator 124 of a workspace learning facility associated, partnered or linked with the modular learning system 144 to, in addition to managing the sale associated with the independent learning facility (e.g., learning facility access for performances of specific microlearning applications), manage the learning performances of a plurality of learners (employees) across a plurality of learning applications available on the system (with the learning user's explicit consent), optionally delegated to a plurality of Human Resource Managers, Trainers and/or immediate superiors, registered as tutoring users 112 on the modular learning system, through an interface displayed on a user device 140.

The modular learning system 144 enables an administrator 124 of a temporary learning facility (e.g., a Cricket Ground available for net practice on Saturdays and Sundays from six in the morning to twelve at midnight) to, in addition to managing the sale associated with the independent learning facility (e.g., learning facility access for performances of specific microlearning applications), manage the hours of accessibility to the designated learning facility, through an interface displayed on a user device 140. In addition to managing the sale and performance of microlearning applications, an administrator of an independent, institutional, workspace, or temporary learning facility may manage the modular purchase of learning infrastructure (e.g., chemistry equipment, computers, cricket stumps) as well as learning tools, aids and materials (e.g., sulphuric acid, swimming goggles, cricket bat) from the modular learning system or a third party, topic wise, subject wise, location wise or otherwise based on the learning applications intended to be offered in the designated learning facility, through an interface displayed on a user device 140.

The modular learning system 144 enables a learning visit organizing user 114 to manage the organization of learning visits, and the sale of learning visits to learning users 102. The learning visit organizing user 114 may also associate a learning visit with compatible microlearning applications. Such learning visits may comprise, for example, a visit to a factory or industrial area, a museum, or a trip to a city. The learning visit organizing user 114 may associate the learning visit with learning applications and manage the learning performances during the learning visits. The management of performances of associated learning applications may be optionally provided by tutoring users 112. The learning visit organizing user 114 communicates with the modular learning system 144 through an interface displayed on a user device 140.

The modular learning system 144 enables a learning workshop organizing user 116 to manage the organization of workshops available to learning users 102. A workshop comprises a plurality of specific microlearning applications to be performed in the workshop, and a sequence of the microlearning applications to be performed at the workshop. The workshop may also specify learning tools, a designated learning facility, and a tutoring user or tutoring users to perform the workshop. As such, the workshop user organizes performance and modules of learning applications to be performed together with a group of learning users 102. The learning workshop organizing users 116 also manage the sale of such microlearning workshop access and manage the learning performances for a plurality of learners. The learning workshop organizing users communicate with the modular learning system 144 through an interface displayed on a user device 140.

The modular learning system 144 enables a learning tools supplying user 118 to provide learning tools and materials such as chemicals, biology samples, computer software, and other materials for use with learning applications to learning users 102. The learning tools supplying user 118 manages the organization and sale of the learning tools and materials (or optionally, access to the same) to learning users and administrators of learning facilities 132. The learning tools supplying user 118 may also associate learning tools with particular learning applications stored on modular learning system 144. Alternatively, the learning tools supplying user 118 may designate the tools available and the modular learning system 144 may determine which learning applications may require the tools provided by the learning tools supplying user 118. The learning tools supplying user communicates with the modular learning system 144 through an interface displayed on a user device 140.

The modular learning system 144 enables a recruiter 120 of learning users 102 to manage the recruitment of learning users 102 through the modular learning system 144. The recruiter 120 may view and filter learning users 102 by specific learning applications performed on the system, scores, metrics and reviews generated in relation to the learning applications performed by learning users 102. The recruiter may access and filter learning users 102 based on demographic data like the language used in performing the learning application. Recruiting user 120 may also operate as a certifying user 108 to certify particular learning applications that may be desirable to the recruiting user 120. The recruiting user may use the certified application as a filter prior considering learning users for a position. The recruiting user 120 manages recruiting access to the modular learning system 144 through an interface displayed on a user device 140.

The modular learning system 144 enables a funding user 122 of learning users 102 to provide funding and scholarship funds and other support to learning users 102. Such funding users 122 may comprise a parent, sibling, friend, spouse, relative, university, employer, or scholarship/grant offering institution. The funds may be provided for the funding of specific learning users or of specific learning applications, or of specific microlearning goods and services associated with the specific learning applications, in small increments, through an interface displayed on a user device 140.

Although the modular learning environment 100 is described as being composed of various, user devices (e.g., personal computer), a network (e.g., internet, intranet, world wide web), learning facilities (e.g., an Independent Learning Facility, an Institutional Learning Facility), it would be appreciated by one skilled in the art that fewer or more kinds of users (e.g., a Learning Application Fact Checking User, a Web Based Offsite Tutoring User), user devices (e.g., a mobile phone device, a portable gaming console device, a tablet device, a learning console device, gaming console device or server device attached to a television or other screen), networks (e.g., an intranet at a preschool, school, college, university, educational board, professional standards authority, coaching/tuition class; a social or professional network; an intranet at a company, HR department, training department and at a training organization) and learning facilities may comprise the modular learning environment 100, with the present disclosure still falling within the scope of various embodiments.

Figure 2:
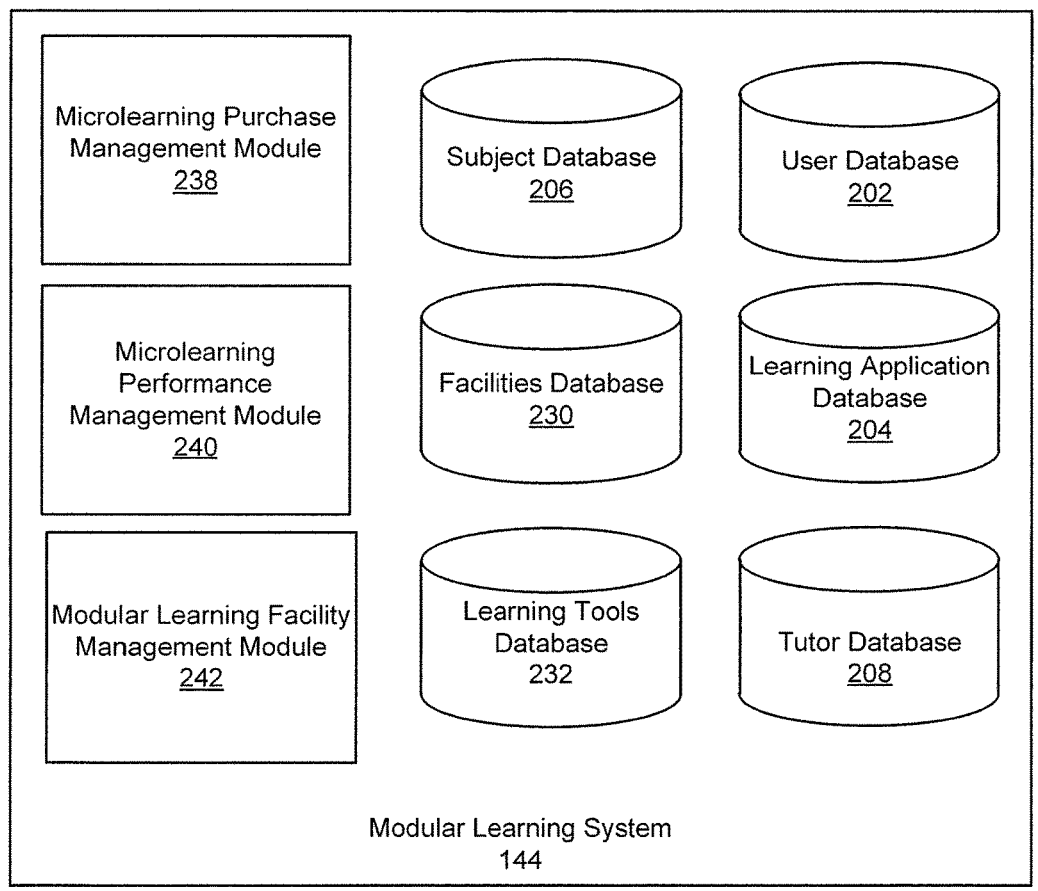
FIG. 2 is a block diagram of a modular learning system according to one embodiment.

FIG. 2 is a block diagram of a modular learning system 144 according to one embodiment. The modular learning system 144 includes a variety of databases and modules for providing learning applications and learning services to users of the modular learning system 144. The modular learning system 144 maintains learning applications in a learning application database 204. The learning applications are sold to users along with microlearning services using the purchase management module 238. Performance of learning applications is enabled by performance management module 240. Additional modules of the modular learning system 144 are described below.

A user database 202 is configured for receiving, storing, updating and retrieving a plurality of data fields of each user, such as the user's name, address, and contact details.

Depending on the user's role in the modular learning system 144, the user database 202 maintains additional information on the user. For example, for a learning user 102, the user database 202 maintains learning history outside the modular learning system 144, learning application performance history on the modular learning system 144, purchase history of learning applications as well as purchase history of a host of related microlearning purchase items like, for example, timed access to learning facility 132, timed access to tutor 112, and purchase of access to a learning tool from learning tools database 232. In some embodiments, the data fields are used to determine purchase compatibility using purchase management module 238 and to determine performance compatibility using performance management module 240.

The user database 202 may maintain information about each type of user based on the user's role in the system. The user information may be stored in a plurality of databases, each database associated with a user role, or the user roles may be stored in a single user database 202. For example, the additional user roles include learning application authoring users, learning facility administering users, learning visit organizing users, learning facility administering users, and other types of users of the modular learning system 144.

In one embodiment, a distinct Learning User Database is configured for receiving, storing, updating and retrieving a plurality of data fields of each learning user 102, comprising the learning user's name, address, contact details as well as learning related data fields like learning history outside the modular learning system 144, learning application performance history on the modular learning system 144, purchase history of learning applications as well as purchase history of a host of related microlearning purchase items like, for example, access to learning facility 132, access to tutor 112, and purchase of access to a learning tool. In one embodiment, a distinct Learning Application Authoring User Database is configured for receiving, storing, updating and retrieving a plurality of data fields of each learning application authoring user, say, user 104. In one embodiment, a distinct Independent Learning Facility Administering User Database is configured for receiving, storing, updating and retrieving a plurality of data fields of each independent learning facility administering user, say, user 124. In one embodiment, a distinct Learning Tools Supplying User Database is configured for receiving, storing, updating and retrieving a plurality of data fields of each learning tools supplying user, say, user 118. In one embodiment, a distinct Learning Visit Organizing User Database is configured for receiving, storing, updating and retrieving a plurality of data fields of each learning visit organizing user 114. In one embodiment, a distinct Learning Application Translating User Database is configured for receiving, storing, updating and retrieving a plurality of data fields of each learning application translating user, say, user 106. In one embodiment, a distinct Learning Application Certifying User Database is configured for receiving, storing, updating and retrieving a plurality of data fields of each learning application certifying user, say, user 108. In one embodiment, a distinct Learning Application Template Developing User Database is configured for receiving, storing, updating and retrieving a plurality of data fields of each learning application template developing user, say, user 110. In one embodiment, a distinct Learning Workshop Organizing User Database is configured for receiving, storing, updating and retrieving a plurality of data fields of each learning workshop organizing user, say, user 116. In one embodiment, a distinct Recruiting User Database is configured for receiving, storing, updating and retrieving a plurality of data fields of each recruiting user, say, recruiting user 120. In one embodiment, a distinct Funding User Database is configured for receiving, storing, updating and retrieving a plurality of data fields of each funding user, say, funding user 122.

In one embodiment, a distinct Institutional Learning Facility Administering User Database is configured for receiving, storing, updating and retrieving a plurality of data fields of each, institutional learning facility administering user, say, user 124. In one embodiment, a distinct Workspace Learning Facility Administering User Database is used to is configured for receiving, storing, updating and retrieving a plurality of data fields of each workspace learning facility administering user, say, user 124. In one embodiment, a distinct Temporary Learning Facility Administering User Database is configured for receiving, storing, updating and retrieving a plurality of data fields of each temporary learning facility administering user, say, user 124. In one embodiment, a distinct Learning Facility Database is configured for receiving, storing, updating and retrieving a plurality of data fields of a plurality of kinds of learning facilities, say, facility 132, as received from a plurality of kinds of learning facility administering users, say, user 124. In one embodiment, a distinct Learning Visits Database is configured for receiving, storing, updating and retrieving a plurality of data fields of each learning visit from the respective learning visit organizing user, say user 124. In some embodiments, the data fields of the databases in the above embodiments are used to determine purchase compatibility using purchase management module 238 and to determine performance compatibility using performance management module 240.

The learning application database 204 is configured for receiving, storing, retrieving and updating a plurality of identifier items for each of a subset of learning applications compatible with each learning facility 132, based on the learning facility metadata 316 of each learning application 300.

The learning application database 204 is further configured for receiving, storing, updating and retrieving all the learning application metadata of all learning applications whose purchase is managed through the module 238. Optionally, all purchase related metadata of the learning application, like number of copies accessed per day per location, language, learning facility, user device, as well as other learning related purchase analytics metadata that may be generated during the purchase process may be received, stored, and updated by the microlearning purchase management module in the learning application database 204.

In one embodiment, the database 204 is configured for receiving, storing, updating and retrieving all the learning application metadata of all learning applications whose performance is managed through the module 240. Optionally, all performance related metadata of the learning application, like number of copies performed per day per location, language, learning facility, user device, as well as other learning related performance analytics metadata that may be generated during the performance process may be received, stored, and updated by the microlearning performance management module in the learning application database 204.

A subject database 206 is configured for receiving, storing, updating and retrieving a plurality of data fields of each subject linked or tagged to each learning application 300 in Subject Metadata 312. The subject database 206 provides a categorization system for the learning applications and enables learning application authoring users, like user 104, to categorize learning applications as belonging to one or more subjects by associating them with one or more subjects, such subjects then stored in subject metadata 312 of each authored learning application 300. The subject database 206 also allows users to search for learning applications according to particular subjects using the subjects associated with the learning applications. For example, a tutoring user 112 with a mathematics specialty may search the learning applications using the subject database 206 to identify mathematics learning applications for the tutor to associate his services with.

A tutor database 208 is configured for receiving, storing, updating and retrieving a plurality of data fields of each tutoring user, comprising the tutoring user's name, address, contact details, as well as learning related data fields like learning users to whom microlearning services have or are being provided, performance data and performance review data for the tutoring services, tutoring history outside the modular learning system 144, and remittance history. In some embodiments, the data fields are used to determine purchase compatibility using purchase management module 238 and to determine performance compatibility using performance management module 240.

A learning facility database 230 is configured for receiving, storing, updating and retrieving a plurality of data fields of a plurality of learning facilities such as learning facility 132 as received from learning facility administering users 124. In some embodiments, the data fields are used to determine purchase compatibility using purchase management module 238 and to determine performance compatibility using performance management module 240.

A learning tools database 232 is configured for receiving, storing, updating and retrieving a plurality of data fields of each learning tool or material from each learning tools supplying user 118. In some embodiments, the data fields are used to determine purchase compatibility using purchase management module 238 and to determine performance compatibility using performance management module 240.

Each of these databases, such as the tutor database 208, facilities database 230, and learning tools database 232, may also include information relating to purchase and performance compatibility. For example, a tutor in the tutor database may specify the tutor is only willing to teach students aged 30-40, or a learning facility may indicate it is only willing to allow entry to learning users who are a member of the facility.

A purchase management module 238 is configured for managing the purchase of learning applications and associated application services as a microlearning stack by the learning user 102.

A performance management module 240 is configured for managing the performance of learning applications and associated application services as a microlearning stack by the learning user 102.

A learning facility management module 242 is configured for setting up and managing a learning facility in a modular learning system. In one embodiment, the learning facility management module 242 processes a request of a learning facility administering user to set up a facility for one or more learning applications. The facility management module 242 compares infrastructure available at the facility to the infrastructure requirements of the one or more learning applications to determine an ergonomic compatibility. In one embodiment, the facility management module 242 may automatically schedule a site visit of a modular learning system administrator to approve the facility for the learning applications. When the facility is approved, the facility management module 242 manages access of learning users and tutoring users to the facility's infrastructure.

In one embodiment, the tutor database, learning facilities database, tools database and other application services databases form a single consolidated application services database in modular learning system 144.

Although the modular learning system 144 is described as being composed of various components like databases and modules, the modular learning system 144 may comprise fewer or more databases, components, and other modules. For example, the modular learning system 144 may include a Learning Application Genre Database, a Locational Learning Facility Price Range Database, a Learning Workshop Database, a Multilingual Dictionary Database, a Concept Tags Database, a Learning Objectives/Outcomes Database, a Micro tutoring Services Database, and a Skill and Ability Tags Database. The modular learning system 144 may also include an Age Compatibility Module, a Learner Ranking Module, a Tutor Ranking Module, a Learner Billing Module, a Tutor Remittance Module, a Profile Management Module, a User Roles Management Module, a Learning Tools Management Module, a Learning Facility Management Module, Metadata Management Module, a Notification Module, a Recruitment Module, a Funding Module, a Map Module, a Learning Application Template Programming Interface Module, an Age Compatibility Module or a Translation Interface Module, with the present disclosure still falling within the scope of various embodiments. In some embodiments, an individual or group may play a plurality of user roles on the modular learning system, (e.g., tutoring user learning new applications as a learning user through another tutoring user, a learning application authoring user translating the authored application or developing the application template), with the present disclosure still falling within the scope of various embodiments.

In various embodiments the modular learning system 144 may be any of a web application, a mobile application, or an embedded module or subsystem of a social networking environment, a learning content management system, a learning management system, a professional networking environment, an electronic commerce system, an electronic payments system, a mobile operating system, a computer based operating system, or of a tablet based operating system, with the present disclosure still falling within the scope of various embodiments.

In one embodiment, a distinct roles management module is configured for managing and authorizing different roles associated with the various users of the modular learning system 144 and in the respective user databases. For example, the roles management module may provide distinct feature tabs and functionalities to each user based on the role associated with him or her. It can be noted that, the roles management module may enable a user to have one or more roles for accessing the modular learning system 144. For example, a tutoring user can avail the functionality and interface tabs of a learning user and also of a translating user if authorized by the modular learning system 144.

In one embodiment, a distinct metadata management module is configured for managing metadata associated with a plurality of specific learning applications, like learning application 300. In one embodiment, the metadata management module is configured for receiving, storing, updating and retrieving various types of metadata associated with each learning application 300 in the learning application database 204. In another embodiment, the metadata management module is configured for receiving and storing updated metadata of a specific learning application 300 in database 204 at regular intervals of time as updated by different users in authorized user roles and retrieving the required metadata when requested by the purchase management module 238 and the performance management module 240 for determining compatibility and performance compatibility of requested microlearning service stack respectively. In yet another embodiment, the metadata management module enables various users of the modular learning platform to update metadata associated with specific learning applications in the learning application database according to their user role.

It is appreciated that, in some embodiments, various databases like 202, 204, 206, 208, 230, and 232, modules 238, 240 and 242 as well as the databases, modules, components and engines of the above embodiments may be stored in the form of machine readable instructions in the memory of the modular learning system 144 and executed by a processor of the modular learning system 144 to perform one or more embodiments disclosed herein. Alternatively, the various databases like 202, 204, 206, 208, 230, and 232, modules 238, 240 and 242 as well as the databases, modules, components and engines of the above embodiments may be implemented in the modular learning system in the form of an apparatus configured to perform one or more embodiments disclosed herein.

FIG. 3A is a block diagram of a learning application 300, according to one embodiment. Each learning application 300 comprises a plurality of kinds of application metadata in addition to the instructional content and associated media for a particular topic or subject. The instructional content and media of each learning application 300 may comprise a specific unit of instruction for a particular portion of knowledge or a skill, and may vary widely in scope. The learning application 300 may be very narrow in scope, such as "treading water" or may be broad in scope, such as "overview of world history", depending on the authoring process of learning application authoring user 104. The learning application 300 could indicate a theoria (to think, a theory based application using primarily memory, reasoning, logic) performance type or a praxis performance type (to do, a practical performance type or a poeisis performance type). The learning application 300 may comprise metadata indicating associated application services for purchasing or performing the learning application 300 like tutor metadata 336, tools metadata 322 and learning facility metadata 316. In one embodiment, the learning application 300 may be requested for purchase or performance with associated application services as a microlearning service stack, wherein the application services comprise of access to tutoring user 112, access to a learning tool from learning tools database 232 and access to a learning facility from facilities database 230. For example, the media metadata 326 of a learning application 300 provided by learning application authoring user 104 may specify instructions for learning how to swim a breaststroke, but the media metadata 326 does not typically specify individual pools i.e. learning facilities to perform the learning application or tutors to coach and review the performance. Rather, the application services metadata like tutor metadata 336, tools metadata 322 and learning facility metadata 316 indicates tutors, tools, and facilities which the learning user may choose to perform the learning application's instructions.

The Certification Metadata 302 is configured for receiving, storing, retrieving, displaying and updating certification history as well as live certifications of the learning application 300, including, for example, a certification from educational board 108 and another educational board in another state, present as a certifying user in database 202 or a distinct certifying user database. In some embodiments, the certification metadata is also used to determine purchase compatibility in the microlearning purchase management module 238 through learning application database 204 and to determine performance compatibility in the microlearning performance management module 240 through learning application database 204.

The Scoring Metrics Metadata 304 is configured for receiving, storing, retrieving, displaying and updating a plurality of metrics for quantitative and qualitative scoring as defined and updated for learning application 300 by learning application authoring user 104. In some embodiments, the quantitative scoring of each metric is conducted during the performance by a dedicated module within the learning application 300 itself, while in other embodiments of a performance, especially a non-screen based praxis or poeisis performance, the quantitative and optionally, qualitative score for each metric is received through a user device 140 from the learning user 102 and/or the tutoring user 112. In some embodiments, the scoring metrics metadata is also used to determine purchase compatibility in the microlearning purchase management module 238 through learning application database 204 and to determine performance compatibility in the microlearning performance management module 240 through learning application database 204.

The Language Metadata 306 is configured for receiving, storing, retrieving, displaying and updating a plurality of translations of all user viewable application metadata for learning application 300 translated by, for example, learning application translating user 106 into Bengali, comprising of media metadata 326 like instructional text, subtitles to audio and video instructions, and all other linguistic content for the preview, performance and review of learning application 300 by learning user 102 and preview and review of the learning performance by tutoring user 112. In some embodiments, metadata 306 further comprises translations in at least one other language, of performance type metadata 308, duration metadata 310, subject links and tags metadata 312, age level metadata 314, learning facility metadata 316, authoring metadata 318, sequence metadata 320, tool metadata 322, mode metadata 324, medium metadata 328 and job skill metadata 330. In some embodiments, the language metadata is also used to determine purchase compatibility in the microlearning purchase management module 238 through learning application database 204 and to determine performance compatibility in the microlearning performance management module 240 through learning application database 204.

The Performance Type Metadata 308 is configured for receiving, storing, retrieving, displaying and updating the performance type of the learning application 300. For example, the metadata 308 could indicate a theoria (to think, a theory based application using primarily memory, reasoning, logic, like a 'Biomechanics of Swimming' Pop Quiz) performance type or a praxis performance type (to do, a practical performance type like an 'eight hundred meters Freestyle Swim as per Olympic performance guidelines' or a poeisis performance type (to make, a creation oriented performance type like a 'five minute Synchronized Swimming Choreography'), such that the learning user is already aware of the task or performance type before purchasing and performing the learning application 300. In some embodiments, the performance type metadata is also used to determine purchase compatibility in the microlearning purchase management module 238 through learning application database 204 and to determine performance compatibility in the microlearning performance management module 240 through learning application database 204.

The Duration Metadata 310 is configured for receiving, storing, retrieving, displaying and updating the suggested duration of the learning application 300. In some embodiments, the metadata 310 indicates a fixed duration like, fifteen minutes, or thirteen minutes, or one hour, while in some other embodiments, the metadata indicates a variable duration with, optionally, a predetermined minimum or maximum duration depending on the duration metadata set by the learning application authoring user 104. In some embodiments, the duration metadata is also used to determine purchase compatibility in the microlearning purchase management module 238 through learning application database 204 and to determine performance compatibility in the microlearning performance management module 240 through learning application database 204.

The Subject Metadata 312 is configured for receiving, storing, retrieving, displaying and updating a plurality of subject links and tags attached to the learning application 300 by the learning content application authoring user from among the subject links and tags present in the Subject Database 206. In some embodiments, the subject links and tags are attached to specific concepts or terms within the Media Metadata 326. In some embodiments, the subject link/tag metadata is also used to determine purchase compatibility in the microlearning purchase management module 238 through learning application database 204 and to determine performance compatibility in the microlearning performance management module 240 through learning application database 204.

The Age Level Metadata 314 is configured for receiving, storing, retrieving, displaying and updating the suggested age level of the learning user 102 for performance of the learning application 300. In some embodiments, the age level is set as a minimum suggested age say, for example, 10+ by the learning application authoring user 104. In other embodiments, a range of suggested learner ages is set by the learning application authoring user 104. In some embodiments, the age level metadata is also used to determine purchase compatibility in the microlearning purchase management module 238 through learning application database 204 and to determine performance compatibility in the microlearning performance management module 240 through learning application database 204.

The Learning Facility Metadata 316 is configured for receiving, storing, retrieving, displaying and updating the suggested learning infrastructure required in a learning facility for performance of the learning application 300. In some embodiments, such learning facilities and infrastructure (e.g., Olympic Sized Swimming Pool) required for the performance of the learning application (e.g., eight hundred meters Freestyle to Olympic Guidelines) is received and updated by the learning application authoring user 104 by picking the same from a learning facility database 230 available on the modular learning system 144. In other embodiments the metadata 316 is received and updated by the administering user 124 of learning facility 132. In some embodiments, the learning facility metadata is also used to determine purchase compatibility in the microlearning purchase management module 238 through learning application database 204 and to determine performance compatibility in the microlearning performance management module 240 through learning application database 204.

The Authoring Metadata 318 is configured for receiving, storing, retrieving, displaying and updating the authoring metadata received by the learning application author 104, including for example the name, signature, contact details, intellectual property disclaimer and other information of the user or user group. In some embodiments, the metadata also includes metadata generated by the modular learning system 144 during the authoring user's editing process, including the version history, tracked changes and time stamps of edits and updates to the learning content application. In some embodiments, the metadata may also include citations to other learning content applications or other learning content application authoring users made by the user 104.

The Sequence Metadata 320 is configured for receiving, storing, retrieving, displaying and updating the suggested sequence of performance of the learning application 300 relative to another learning application. The sequence metadata may indicate if the learning application should be performed before, after, instead of, or with another learning application by learning application authoring user 104. The user 104 may wish for any learning user, say 102 to perform an advanced microbiology learning application 300 only after performing a corresponding beginner's microbiology learning application, irrespective of the learning user's age or quality of performance. In other embodiments, wherein the learning application authoring user is not the author of the suggested beginner's application, the user 104 may input a sequence suggesting to the learning user 102 to perform the learning application before or after a learning application authored by another learning application authoring user. In some embodiments, the sequence metadata is also used to determine purchase compatibility in the microlearning purchase management module 238 through learning application database 204 and to determine performance compatibility in the microlearning performance management module 240 through learning application database 204.

The Tool Metadata 322 is configured for receiving, storing, retrieving, displaying and updating the compatible tools or learning materials to the learning application 300. In some embodiments, the tool compatibility is received from and updated by the learning application authoring user 104 by accessing the tool database 232. In other embodiments, the tool compatibility is received and updated by the learning tools supplying user 118 by accessing the learning application database 204. In still other embodiments, the tool compatibility may be updated by the modular learning system 144. In some embodiments, the tool metadata is used to determine purchase compatibility in the microlearning purchase management module 238 through learning application database 204 and to determine performance compatibility in the microlearning performance management module 240 through learning application database 204. In some embodiments, wherein the learning tool is a peripheral input device which can be connected to the user device 140 during the learning application performance (e.g., Electric Guitar attached to a user device 140 during an 'Introduction to Hard Rock' learning application) the Tool Metadata includes the compatibility to the user device 140. In other embodiments, wherein the learning material is not material to the user device 140, (e.g., Sulphuric Acid during a Chemistry Experiment) the Tool Metadata may not include any additional user device compatibility.

The Mode Metadata 324 is configured for receiving, storing, retrieving, displaying and updating the available modes of performance of the learning application. In some embodiments, the mode metadata is determined by the modes chosen by the learning content application authoring user from the learning application template chosen. In various embodiments, the learning application may comprise an individual learner performance mode, a learner plus learner cooperative performance mode, a learner versus learner competitive performance mode, a learner plus tutor cooperative performance mode, a learner versus tutor competitive performance mode, a limited plurality of learners (e.g., four learners) cooperative performance mode, a limited plurality of learners (e.g., four learners) competitive performance mode, a tutor plus limited plurality of learners (e.g., nine learners) cooperative performance mode (a typical classroom mode). Although the Mode Metadata is described as being composed of various available modes as chosen by the learning application authoring user, various other modes (e.g., a limited plurality of learners vs. a limited plurality of learners competitive performance mode) may comprise the Mode Metadata 324 and still fall within the scope of various embodiments. In some embodiments, the various Media Metadata for the preview, performance and review screens for each mode of the same learning application and the sequence of the same (especially wherein the learning application 300 is performed by multiple users from the same user device and, optionally, by viewing the same display device) is received, stored, retrieved, displayed and updated in the Media Metadata 326. In some embodiments, the mode metadata is also used to determine purchase compatibility in the microlearning purchase management module 238 through learning application database 204 and to determine performance compatibility in the microlearning performance management module 240 through learning application database 204.

The Media Metadata 326 is configured for receiving, storing, retrieving, displaying and updating text, image, audio, video, animation, links and other interactive elements of the learning content application as received and updated by the learning application authoring user 104 during the publishing and revision of the learning content application 300. In other embodiments, the learning application Media Metadata may comprise the theoria, praxis or poeisis task or, optionally, plurality of tasks to be completed during the performance, their sequence, and, optionally, the learning outcomes and objectives of the same. In some embodiments, the media metadata is also used to determine purchase compatibility in the microlearning purchase management module 238 through learning application database 204 and to determine performance compatibility in the microlearning performance management module 240 through learning application database 204.

The Medium Metadata 328 is configured for receiving, storing, retrieving, displaying and updating the medium of access to the learning application preview, review and performance screen during the microlearning performance. For example, for a Beginner's Kathak Dancing microlearning Application, in addition to requiring a compatible learning facility and tutoring user, the learning application authoring user 104 or, optionally, modular learning system 144 may require the preview and review screen to be viewable only on a display device connected to a learning console user device or the display device of a computer device but not a mobile device screen to ensure an optimum learning experience. In another case, for a Kathak Quiz microlearning application, the learning application authoring user 104 or, optionally, modular learning system 144 may require the performance screen, preview screen and review screen to be viewable only on a mobile device screen but not on a display device connected to a learning console user device, or the display device of a computer device. In some embodiments, the medium metadata may further comprise the compatibility to a plurality of software platforms and, optionally, runtime environments as determined by the modular learning system 144. In some embodiments, the medium metadata is also used to determine purchase compatibility in the microlearning purchase management module 238 through learning application database 204 and to determine performance compatibility in the microlearning performance management module 240 through learning application database 204.

The Job Skill Metadata 330 is configured for receiving, storing, retrieving, displaying and updating the skills and abilities tagged to the learning application 300 by the learning application authoring user 104, the recruiting user 120 or, optionally, the modular learning system 144 from a skills and abilities database provided by the modular learning system 144. In some embodiments, the metadata is used by a recruiting user 120 to post the completion of the learning application (optionally, in a controlled testing environment) or group of applications as a minimum requirement for a particular job role to a plurality of potentially employable learning users. In other embodiments, the metadata is used by the recruiting user 120 to post the requirement of completion of the learning application 300 (optionally, in a controlled testing environment) or group of applications as a minimum requirement for a promotion to a higher post in a particular organization, to a plurality of potentially employable learning users. In some embodiments, the job skill metadata is also used to determine purchase compatibility in the microlearning purchase management module 238 through learning application database 204 and to determine performance compatibility in the microlearning performance management module 240 through learning application database 204.

The Error Metadata 332 is configured for receiving, storing, retrieving, displaying and updating the potential errors which can be made by the learning user 102 (e.g., 10 potential errors in an auditing microlearning application), as determined by the learning application authoring user 104. In some embodiments, wherein the learning application (e.g., a Karnataka History Quiz) is performed through an input device on a user device 140 itself, the error metadata may be synchronized to each potential input point during the learning application 300 performed through the user device 140 by the learning application authoring user 104. In some embodiments, wherein the learning application (e.g., a Karate kata) 300's error metadata is outside the recordable boundaries of the user device 140, the potential errors may be entered with reference to each instructional step of the performance by the learning application authoring user 104, such that at the time of the performance, the tutoring user (or, in some modes, the learning user 102 himself, another learning user, or the recruiting user 120) may note errors in each observable step of the performance and confirm the same on user device 140 to generate the score. In other embodiments, wherein the error observed by the observing user (say, tutoring user 112) is not part of the potential errors in the Error Metadata 332 of the application 300, the tutoring user 112 may update such errors to the Errors Metadata, or optionally, send the same to the learning application authoring user 104, to be updated after review. In some embodiments, the error metadata is also used to determine purchase compatibility in the microlearning purchase management module 238 through learning application database 204 and to determine performance compatibility in the microlearning performance management module 240 through learning application database 204.

The Template Metadata 334 is configured for receiving, storing, retrieving, displaying and updating the default script, formatting and media modules of the learning application template used to author the learning application 300. In some embodiments, wherein a particular sequence and format of the same has been chosen by the learning content application authoring user from the options offered in the template developed by the learning application template developing user, the chosen setting may be a part of the Template Metadata 334. In various embodiments, the learning application templates may comprise a quiz, role play, simulation, project, experiment, essay, recital, research paper, race, challenge, problem, game, question, exercise or problem set. In some embodiments, the templates may be for performances conducted and supervised in front of a display device with an input device connected to the user device 140, while in other embodiments the templates may be for previews, reviews and guidelines for performances conducted without the input device, with the user device 140 merely placed next to the performance area or learning station (e.g., for Praxis Tasks in Dance Applications) as a reference point. Although the Template Metadata is described as being composed of various available templates as developed by the learning application template authoring user and chosen by the learning application authoring user, various other templates (e.g., a Swimming Race Template, a Patent Drafting Template) may comprise the Template Metadata 334 and still fall within the scope of various embodiments. In some embodiments, the template metadata is also used to determine purchase compatibility in the microlearning purchase management module 238 through learning application database 204 and to determine performance compatibility in the microlearning performance management module 240 through learning application database 204.

The Tutor Metadata 336 is configured for receiving, storing, retrieving, displaying and updating the compatibility of tutoring users to learning content application. In some embodiments, the tutoring user compatibility is received from and updated by the tutoring user 112 by updating the tutor database 208 (e.g., a Mathematics Tutoring User whose medium of instruction is Mandarin updating compatibility to a plurality of Mathematics microlearning applications available in Mandarin, in the tutor database 208). In other embodiments, the tutoring user compatibility metadata is received from and updated by the tutoring user 112 by accessing the learning application database 204. In still other embodiments, the tutoring user compatibility metadata may be updated by the modular learning system 144. In some embodiments, the Tutor Metadata is also used to determine purchase compatibility in the microlearning purchase management module 238 through learning application database 204 and to determine performance compatibility in the microlearning performance management module 240 through learning application database 204.

In various embodiments, the metadata of learning application 300 is configured for retrieving, displaying to and updated by a plurality of kinds of users as may be applicable to the kind of metadata and the kind of user. Optionally, in addition to receiving and storing the metadata, the modular learning system 144 may update the learning application metadata as and when generated in the system through a dynamic metadata update module or through a dedicated administering user. In some embodiments, the learning application authoring user 104 may further play the role of the learning application template developing user. In some embodiments, the modular learning system 144 may play the role of the learning content application authoring user 104 and, optionally, the role of the learning application template developing user 110 to author and update the media and template metadata of the learning application 300.

In some embodiments, the microlearning purchase management module 238 and microlearning performance management module 240 retrieve some or all of the above metadata associated with the learning application 300 from a learning application database 204 in a repository module of the modular learning system 144.

In some embodiments, the media metadata 326 of the learning application may comprise an electronic textbook, an electronic journal, an instructional video, or an instructional animation. In some embodiments each learning application 300, may be a distinct mobile application, browser based web application, or a desktop application. In some embodiments, each learning application 300 may be an executable file, a program, add in, macro, plug-in, or other program of instructions associated with a plurality of application programming interfaces of the modular learning system 144.

Although the learning application 300 is described as comprising various metadata and associated data fields stored and updated in learning application database 204, fewer or more metadata and associated data fields (e.g., Application Programming Interface Metadata, Organization versus Organization Social Learning Mode Metadata, University versus University Social Learning Mode Metadata, Testing Metadata, Learning Visits Metadata, Learning Workshops Metadata, Tutorials Metadata) may comprise the Learning Application 300 and associated learning application database 204, with the present disclosure still falling within the scope of various embodiments. In some embodiments, each version of the same learning application 300 with different metadata, for example language metadata, is treated as a distinct learning application in learning application database 204.

In some embodiments, an authorization to update certification metadata 302 of a learning application 300 is limited to a predetermined plurality of certifying users like user 108 and recruiting users like user 120. In some embodiments, an authorization to update scoring metrics metadata 304, performance type metadata 308, age level metadata 314, authoring metadata 318, mode metadata 324, media metadata 326, medium metadata 328, and error metadata 332 of a learning application 300 is limited to a predetermined plurality of learning application authoring users like user 104. In some embodiments, an authorization to update language metadata 306 of a learning application 300 is limited to a predetermined plurality of learning application translating users 106. In some embodiments, an authorization to update duration metadata 310 of a learning application 300 is limited to a predetermined plurality of learning application authoring users like user 104 and learning application template developing users like user 110. In some embodiments, an authorization to update subject link/tag metadata 312 of a learning application 300 is limited to a predetermined plurality of users in any user role. In various embodiments, such authorizations may be set by an administrator of system 144 based on the user role, user profile information and user preferences information of the corresponding users.

In some embodiments, an authorization to update learning facility metadata 316 of a learning application 300 with associated learning facilities is limited to a predetermined plurality of learning facility administering users like user 124. In some embodiments, an authorization to update sequence metadata 320 of a learning application 300 is limited to a predetermined plurality of learning application authoring users like user 104 and tutoring users like user 112. In some embodiments, an authorization to update tool metadata 322 of a learning application 300 with associated learning tools is limited to a predetermined plurality of tool supplying users like user 118. In some embodiments, an authorization to update job skill metadata 330 of a learning application 300 is limited to a predetermined plurality of recruiting users like user 120. In some embodiments, an authorization to update template metadata 334 of a learning application 300 is limited to a predetermined plurality of learning application authoring users like user 104 and a predetermined plurality of template developing users like user 110. In some embodiments, an authorization to update tutor metadata 336 of a learning application 300 with associated tutoring services is limited to a predetermined plurality of tutoring users like user 112. In some embodiments, an authorization to update an optional learning event metadata of a learning application 300 with associated learning workshops, visits and other learning events is limited to a predetermined plurality of learning workshop organizing users like user 116 and learning visit organizing users like user 114. In some embodiments, the associations of application services to learning applications are enabled automatically by a metadata association module in the system 144. In some embodiments, each learning application 300 is associated with a subset of learning facilities in a learning facilities database 230. In some embodiments, each learning application 300 is further associated with a subset of learning stations of each associated learning facility. In some embodiments, each learning application is associated with a subset of tutors in a tutor database 208. In some embodiments, each learning application is associated with a subset of tools in a learning tools database 232.

Figure 3B:
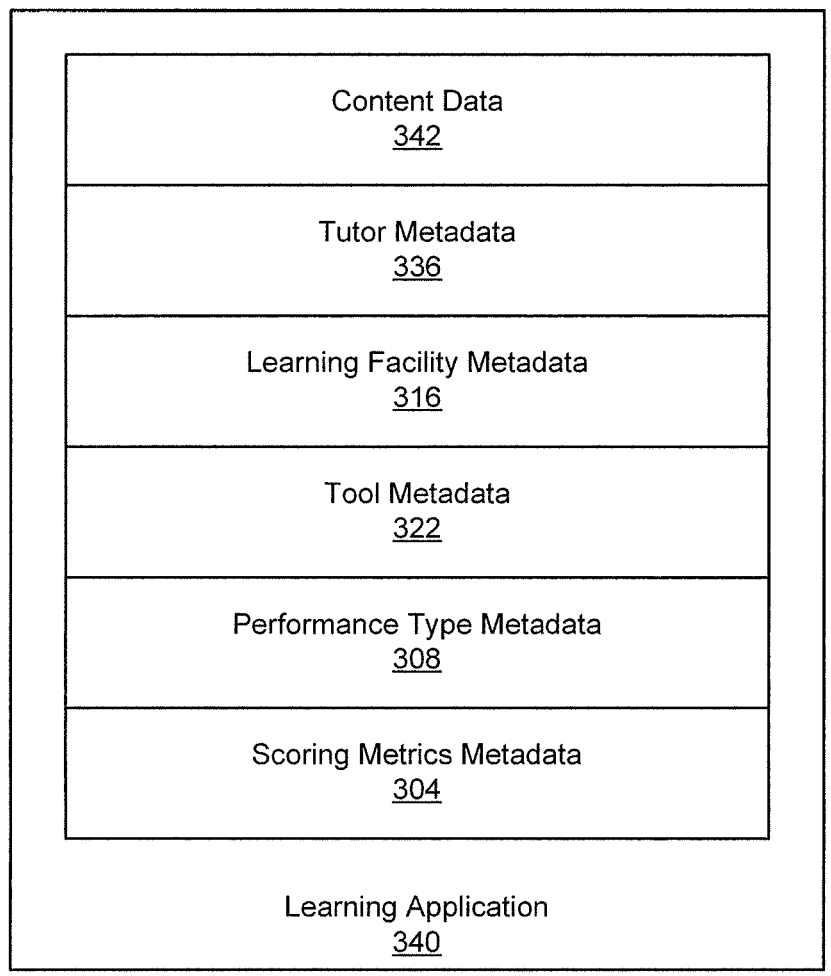
FIG. 3B is a block diagram of a learning application according to an alternative embodiment.

FIG. 3B is a block diagram of a learning application 340 according to another example embodiment. The learning application 340 is illustrated to depict metadata of the learning application related to a microlearning service stack. The learning application 340 also illustrates some other performance data used during its performance by a learner. This microlearning service stack may be requested for purchase or performance by learning user 102. In this embodiment, the microlearning service stack includes a learning application 340, a time based tutoring service by a particular tutor in database 208, time based access to a particular learning facility from database 230, and access to a particular tool from database 232. The particular services above may or may not be associated with the corresponding tutor metadata, facilities metadata, and tool metadata of learning application 340 at the time of a request. The learning application 340 includes content data 342 which designates particular content media and content attributes of the learning application 340. The learning application also includes other metadata as described above, such as tutor metadata 336, learning facility metadata 316, learning tool metadata 322, performance type metadata 308, and scoring metrics metadata 304. As such, the learning application 340 illustrates some aspects of the learning application used for purchase or performance of the learning application 340 by a learner as part of a microlearning service stack, such as content, tutors, facilities, and tools. The learning application 340 may also include any other metadata as described above with reference to FIG. 3A. Any other metadata as described above with reference to FIG. 3A may also be part of the content data 342 of the learning application 340.

The lifecycle of a learning application 300 is now described according to one embodiment. Initially, a learning application template developing user 110 creates a learning application template stored in a distinct template database in a modular learning system 144. Next, the learning application authoring user 104 publishes learning application content stored as media metadata of the learning application 300. In case a template has been chosen for the application 300, the template metadata is stored as well. The tutor metadata, learning facility metadata, learning tool metadata and other optional application services metadata indicating tutoring services, learning facilities, learning tools, and other application service types associated with the learning application 300 are dynamically updated by the corresponding tutoring users, learning facility administrators, tool suppliers and other application service providers. At this point, the learning user may modularly select application services in a microlearning stack to purchase or perform the learning application. Next, the learning user 102 selects the learning application 300 and identifies application services requested for purchase or performance as a consolidated stack. The approval of the purchase or performance request for learning application 300 and particular application services in the microlearning service stack may be determined by the specific metadata of the learning application 300 being associated with corresponding application services, and other specific metadata of the learning application being compatible with the profile information and preferences of the learning user.

Figure 4:
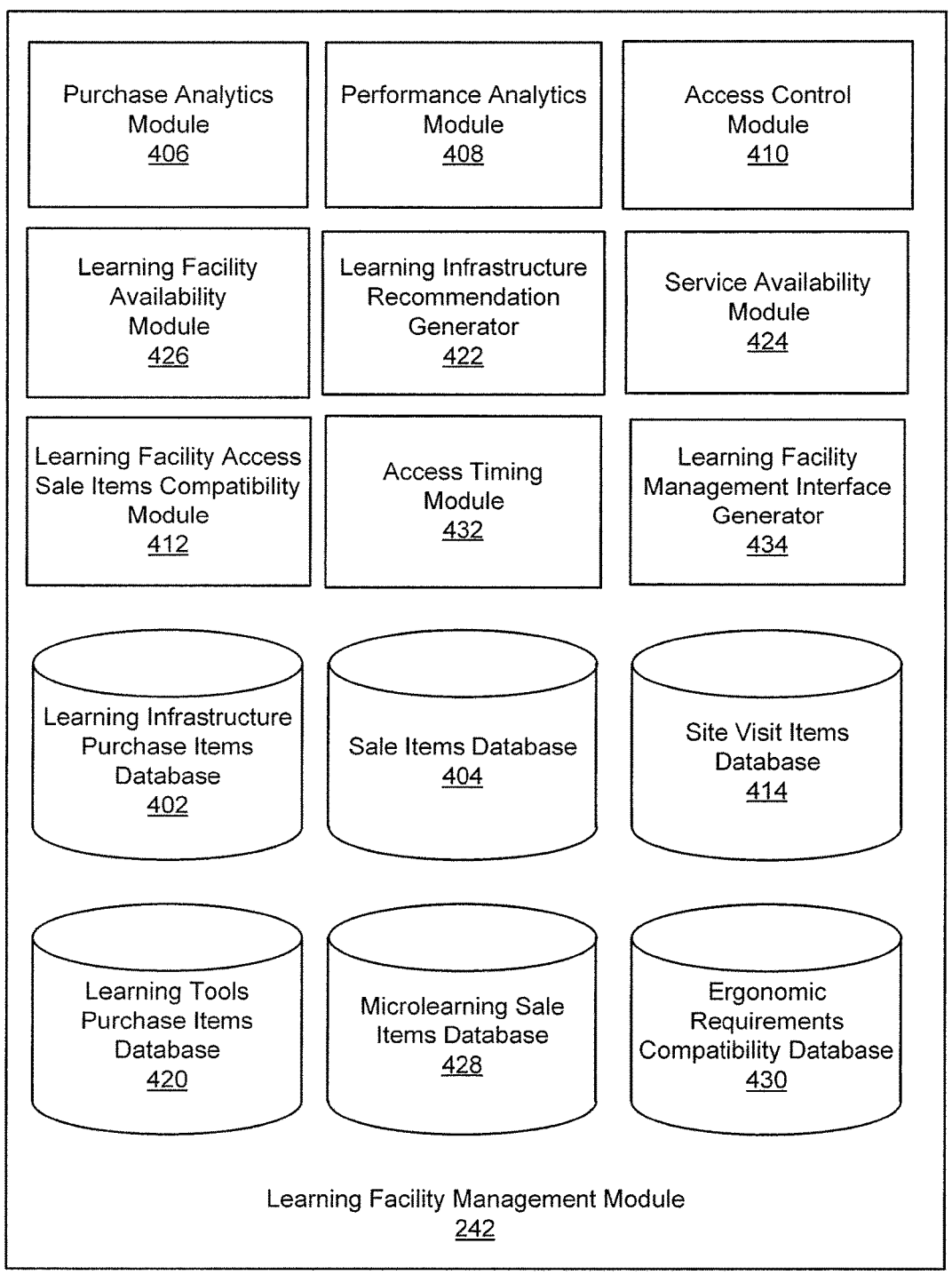
FIG. 4 is block diagram of a modular learning facility management module according to one embodiment.

FIG. 4 is block diagram of a modular learning facility management module. The learning infrastructure purchase items database 402 is configured for receiving, storing, retrieving and updating a plurality of purchase items for each unique unit of learning infrastructure offered for sale and setup to administering user 124 during the setup of learning facility 132. In one embodiment, the purchase items may be received and stored with corresponding prices by a plurality of learning infrastructure providers on the modular learning system 144.

The sale items database 404 is configured for receiving, storing, retrieving and updating a plurality of sale items to be offered for sale to a plurality of kinds of users on the modular learning system 144. In one embodiment, the sale items are bulk learning facility access purchased by learning event organizing users 114 and 116 or bulk learning facility access purchased by recruiting users 120 for interview performance during the recruitment of learning users on the system.

The purchase analytics module 406 is configured for generating and receiving a plurality of purchase analytics data items for each learning facility access purchase, by accessing purchase data items of the learning applications from the microlearning purchase management module 238. Further, the purchase analytics module 406 is used to generate a plurality of purchase analytics data interface items for the corresponding data items of each learning application. The interface generator 434 accesses the interface items and displays the same to each corresponding learning facility administering user through an interface on the learning facility administering user's user device 140.

The performance analytics module 408 is configured for generating and receiving a plurality of performance analytics data items for each learning application performed in the learning facility by accessing performance data items of the learning applications from the microlearning performance management module 240. Further, the performance analytics module 408 is used to generate a plurality of performance analytics data interface items for the corresponding data items of each such learning application. The interface generator 434 accesses the interface items and displays the same to each corresponding learning facility administering user 124 through an interface on the learning facility administering user 124's user device 140. In some embodiments, the performance data items of the learning application may exclude the identity items of the learning users who have performed the learning application, based on the performance privacy preferences of the learning users in the user database 202.

The access control module 410 is configured for authorizing or denying access to each learning facility 132 based on check-in credentials entered at an access control point at each such learning facility 132. In some embodiments, the check-in credentials may be a user name and password filled in by each learning user 102 and, optionally, each tutoring user 112, while requesting access to the learning facility. In some embodiments, the credentials may be a unique identity number with a corresponding user role for each learning user and, optionally, each tutoring user received from a smart card via a corresponding reading protocol at the access control point of the learning facility 132. In some embodiments, the username, password, and/or card identification number are compared by the access control module 410 with the corresponding check-in credentials of the users by accessing the same from the identity items of each of the users in user database 202. If the check-in credentials match the corresponding credential preferences, access is granted to the learning facility 132, whereas if the credentials of a user do not match the credential preferences, access is denied to the user. If a learning user 102 or tutoring user 112 is authorized access by modules 238 or 240 to a subset of learning facilities from the plurality of independent, institutional, workplace or temporary learning facilities associated with the modular learning system 144 and present in the learning facility database 230, the access control module 410 may further determine whether the identity items of the users in user database 202 contains access authorization items for the learning facility before granting access to the facility 132. For example, a learning user 102 may purchase a learning plan through purchase management module 238 that grants performance access to the learning user 102 to all learning facilities in a particular city, say Mumbai, India, or in a particular region, say the state of California, only.

The sale items compatibility module 412 is configured for accessing the learning facility metadata 316 of each learning application from the plurality of learning applications in the learning application database 204 to determine the compatibility of any learning infrastructure in the learning facility 132, to a learning facility purchase request received by purchase management module 238. If the request is not compatible with any learning infrastructure in the learning facility, module 238 accesses an incompatibility item generated by the performance analytics module 408 and denies purchase of learning facility access for the performance request to the learning user. If the learning infrastructure in the facility 132 is compatible with the learning application performance requested, the purchase management module 238 receives the corresponding compatibility item generated by the sale items compatibility module 412 and approves the purchase of the microlearning application service, in this case, access to learning facility 132.

The site visit compatibility items database 414 is configured for receiving, storing, retrieving and updating a plurality of compatibility report items for each site visit conducted at each prospective learning facility 132, including setup request approval or setup request denial preference choices received from an administrator or a plurality of administrators of the modular learning system 144. Upon completion of the site visit by the administrator of modular learning system 144 at the scheduled date and time indicated in a corresponding site visit scheduling interface item, the site visit items database 414 receives the compatibility status of the prospective facility 132 with the learning infrastructure purchase item to be set up by administering user 124 at the facility, from inputs received through a site visit compatibility interface generated by generator 434 and displayed on an user device to the corresponding administrator of modular learning system 144. If the administrator 124 denies learning facility approval to prospective facility 132 due to ergonomic incompatibility or other qualitative factors, the corresponding compatibility report and 'Setup Request Denied' interface item are generated by generator 434 and displayed through a learning facility management interface, to user 124 on the user's user device 140. If the prospective learning facility 132 is approved by the corresponding administrator 124 after the site visit, the compatibility report item and corresponding 'Learning Facility Approved' interface item is generated by generator 434 and displayed through a learning facility management interface on user 124's user device 140.

The learning tool purchase items database 420 is used to receive, store, retrieve and update the plurality of purchase items generated by a learning tools transaction processor during a purchase of learning tools compatible with a purchased learning application from the corresponding learning tools supplying users 118.

The learning infrastructure recommendation generator 422 is configured for accessing learning infrastructure purchase items stored in infrastructure purchase items database 402 and retrieves compatible and, optionally, recommended learning infrastructure with the price of the same for the learning applications or, optionally, subjects chosen by administering user 124.

The ergonomic requirements compatibility database 430 is accessed by generator 422 to retrieve the ergonomic requirements of the chosen learning applications at the learning facility 132. The interface generator 434 accesses the ergonomic requirement items for the preferred learning applications from infrastructure recommendation generator 422 and displays the same to user 124 against each preferred learning application's interface item through a learning facility ergonomic management interface displayed on user 124's user device 140.

The service availability module 424 is configured for determining learning facility access and learning infrastructure access at the time of the corresponding learning facility access request and learning infrastructure access request. If learning infrastructure access or learning facility access is not immediately available or authorized, the service availability module 424 requests the access control module 410 to deny access to the corresponding learning infrastructure or learning facility. If, however, the access is available and authorized, the service availability module 424 requests the access control module 410 to grant the corresponding access to the requesting user or set of users. If the learning infrastructure access is granted, the module 424 requests the timing module 432 to initiate an access timer and requests the microlearning performance management module 240 to process the learning application performance.

The learning facility availability module 426 is configured for updating the learning facility's accessibility and the corresponding availability of the chosen learning applications at the learning facility in the learning facility database 230 and updates the learning facility metadata 316 of each chosen learning application 300, to display compatibility of the learning facility 132 with each such learning application 300, when the learning application is requested to be performed by a learning user 102.

The microlearning sale items database 428 is configured for receiving, retrieving and updating a plurality of microlearning sale items and corresponding preferences as chosen or filled in by user 124 through a microlearning sale preferences interface generated by generator 434 and displayed to user 124 on user 124's user device 140. The microlearning sale item preferences are received for each microlearning sale item to be offered for sale by user 124 to a plurality of learning users in user database 202. In one embodiment, the sale items are purchases of access to one or more learning infrastructures at the learning facility 132. The microlearning sale items are accompanied by a price per unit of time or per learning application performance. The sale item may alternatively be an aggregated discounted sale item for access to a plurality of learning infrastructures in the learning facility at a common price per unit of time or application performance. In some embodiments, the microlearning sale item may be subscription based access or membership based access to the learning facility itself for a predetermined unit of time, say one year, or a predetermined number of learning application performances, say 100 performances, to be purchased by each learning user apart from the learning infrastructure access itself. In some embodiments, the microlearning sale items may further include access to or sale of a learning tool in predetermined units or units of time. The microlearning sale items are accessed by a microlearning marketplace module of modular learning system 144 for display to some or all of the plurality of learning users in database 202.

The ergonomic requirements compatibility database 430 stores ergonomic requirements associated with learning applications. If the administering user 124 does not confirm ergonomic compatibility of each ergonomic requirement item of each learning infrastructure item to be set up for the chosen learning applications at the learning facility 132, the inputs are received by the ergonomic compatibility database 430, and the learning facility management module 242 does not request a site visit from an administrator of the modular learning system 144 to facility 132. The interface generator 434 then accesses the generated ergonomic incompatibility items and corresponding learning facility purchase items from the ergonomic compatibility database 430 and displays the same to the administering user 124. The interface generator 434 may also receive updated preferences of learning infrastructure purchase items and corresponding ergonomic compatibility from user 124 through a learning facility ergonomic compatibility interface generated by generator 434 and displayed on user 124's user device 140. If administering user 124 confirms ergonomic compatibility of each learning infrastructure purchase item's ergonomic requirements to the prospective facility 132 through confirmation preferences chosen for each learning infrastructure purchase item on the interface generated by generator 434, a site visit scheduling module accesses the ergonomic compatibility items from database 430, generates a unique site visit scheduling item, and displays the same on a user device to an administrator of the modular learning system 144.

The access timing module 432 is configured for recording the start time, end time, and duration of access to each unit of learning infrastructure in each learning facility 132 from the point at which the requesting user receives authorization to access the unit of learning infrastructure to the point of receipt of the performance completion report. In some embodiments, the microlearning purchase management module 238 may access the access times recorded by the access timing module 432 to generate the learning facility access purchase item and corresponding purchase analytics item, depending on the price per unit of time as chosen or filled in by the learning facility administering user 124 for each purchased unit of learning infrastructure. After the completion of the learning application performance, the performance management module 240 receives a performance completion input from the performing learning user, the learning facility administering user, the duration metadata 310 of the learning application 300, or the tutoring user 112, and generates and sends a performance completion report to the timing module 432 which then pauses or stops the access timer. If a plurality of learning applications are scheduled to be performed using the same learning infrastructure in the same performing area by the same requesting user or set of requesting users, the access timing module 432 may stop the access timer upon receiving the performance completion reports for all the learning applications from the performance management module 240. If the learning application is requested to be performed a second time by the requesting user or set of requesting users using the same learning infrastructure at the same learning station or performance area, and the service availability of the re-performance request is confirmed by module 424, the module 432 may pause or stop the access timer after the completion of the requested second performance of the learning application by the requesting user. Alternatively, if the next learning application is scheduled or requested to be performed by the requesting user or set of requesting users using different learning infrastructure at a different learning station or performance area within the same learning facility, the module 432 may pause or stop the access timer after the completion of all such learning applications at each such learning station or performance area in one accessed session to the learning facility 132 by the requesting user or set of requesting users.

The learning facility management interface generator 434 is configured for generating a plurality of interfaces and corresponding interface items during the setup and management of each learning facility 132 by accessing the corresponding items from the purchase analytics module 406, the performance analytics module 408, or other modules in the modular learning facility management module 242, and displays the same, optionally, with corresponding input areas to a learning facility administering user 124 on the user's user devices 140.

Although the modular learning facility management module 242 is described as being composed of various modules and databases, fewer or more modules or databases (e.g., Site Visit Scheduling Module, Learning Infrastructure Transaction Processor, Learning Infrastructure Purchase Confirmation Items Module, Learning Infrastructure Setup Confirmation Items Module) may comprise the module with the configuration still falling within the scope of various embodiments.

Figure 5:
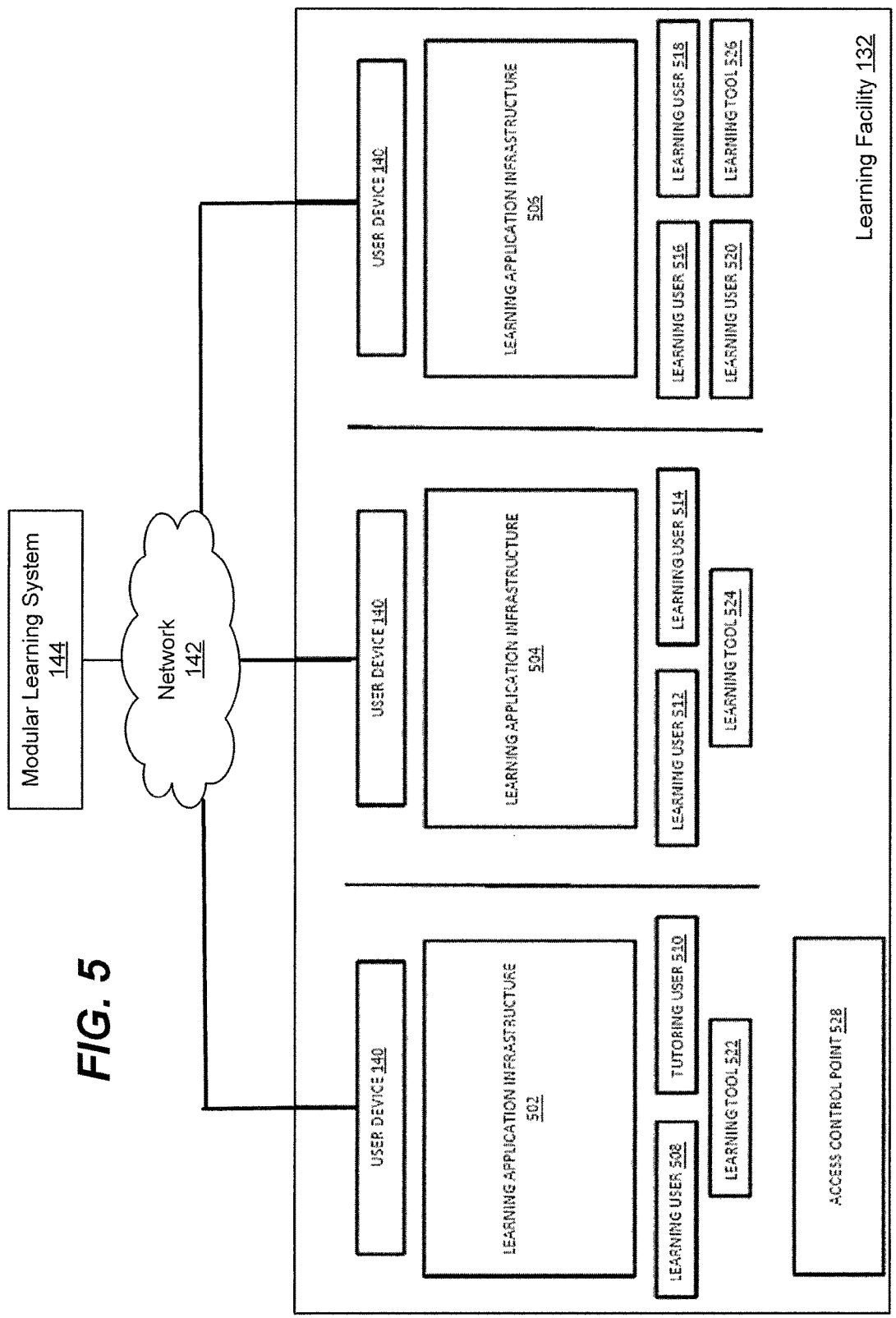
FIG. 5 is an illustration of a modular learning facility according to one embodiment.

FIG. 5 is an illustration of a modular learning facility 132. For clarity, three areas of learning infrastructure within learning facility 132 are illustrated in FIG. 5, though learning facility 132 may comprise any number of infrastructure areas. User devices 140, which are connected to the modular learning system 144 through network 142, may be located at or near each infrastructure location. The learning facility 132 may be managed by learning facility administering user 124 through a user device 140 connected to the modular learning system 144 over a network 142. The access control point 528 grants or denies access to the facility 132 and in some embodiments, is itself connected to a user device 140 which is further connected to the modular learning system 144 via network 142. The access control module 410 of learning facility management module 242 determines access by learning users and, optionally, tutoring users to the learning facility 132. The learning infrastructure 502 is located in a distinct performance area of facility 132. A learning user 508 may be learning swimming with a coach, i.e. a tutoring user 510, using a learning tool 522 such as swimming goggles and using a swimming pool, i.e. learning application infrastructure 502. The user device 140 may display the preview, performance, and review interfaces for a breast stroke swimming application which is performed seven times in a single learning access session by learning user 508, and monitored and reviewed by tutoring user 510. Similarly, infrastructure 504 may represent a badminton court accessed by two learning users, 512 and 514, each using a badminton racket to compete in a badminton serving application whose preview, performance, and review interfaces may be displayed on a user device 140 present nearby. Similarly, infrastructure 506 may represent an Indian Classical dancing stage accessed by learning users 516, 518, and 520, each accessing a kathak costume to perform a synchronized group kathak dancing application whose preview, performance and review is displayed to the one or more learning users on a user device 140 present nearby.

Figure 6:
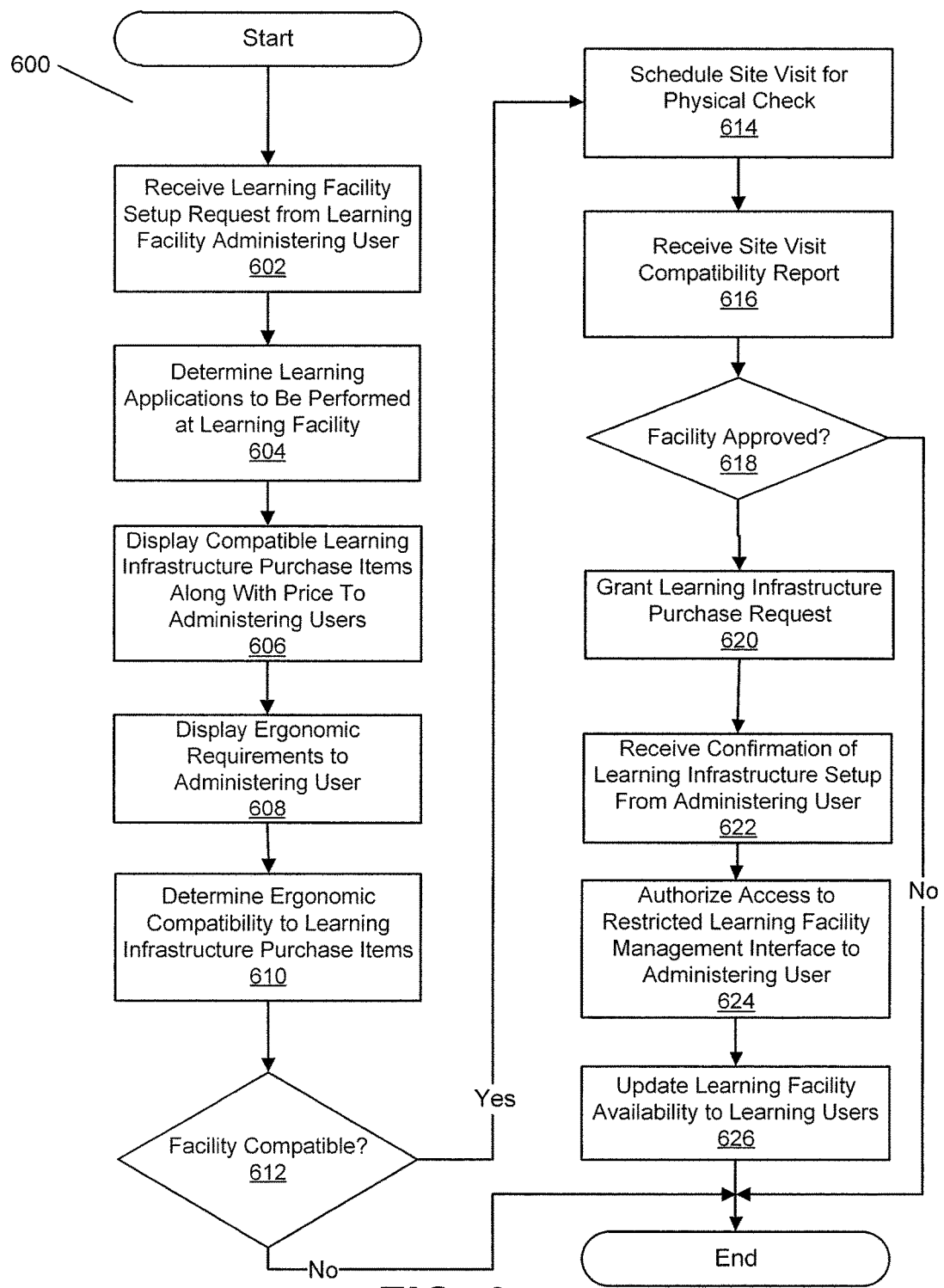
FIG. 6 is a flow diagram of a method to set up a modular learning facility in a modular learning system according to one embodiment.

FIG. 6 is a flow diagram 600 of a method to set up a modular learning facility through a modular learning system. At step 602, the learning facility management module 242 receives a learning facility setup request from a learning facility administering user 124, through an interface generated by learning facility management interface generator 434 on the user 124's user device 140. At step 604, the modular learning facility management module 242 displays at least one learning application and, optionally, subjects to be made available by user 124 in the prospective facility 132, by accessing the same from the subjects database 236 and the learning application database 204, through an interface generated by generator 434 on user 124's user device 140. The learning facility recommendation generator 422 receives the preferred plurality of learning applications or, optionally, subjects from those chosen by learning facility administering user 124. The recommendation generator 422 accesses learning infrastructure purchase items in the purchase items database 402 and retrieves compatible learning infrastructure with the price of the same for the learning applications or, optionally, subjects chosen by user 124.

At step 606, interface generator 434 retrieves the compatible learning infrastructure purchase items with corresponding prices and displays the same to administering user 124 through an interface generated by interface generator 434, on user 124's user device 140. At step 608, the ergonomic requirements compatibility database 430 is accessed by recommendation generator 422 to retrieve the ergonomic requirements of the chosen learning applications at the learning facility 132. The interface generator 434 accesses the ergonomic requirement items for the preferred learning applications from recommendation generator 422 and displays the same to administering user 124 against each preferred learning application's interface item through a learning facility ergonomic management interface on user 124's user device 140. At step 610, the interface generator 434 generates input areas for each ergonomic requirement of each learning infrastructure purchase item, to be confirmed by user 124 and displayed to user 124 through a learning facility ergonomic compatibility confirmation interface generated by interface generator 434 and displayed on user 124's user device 140.

At step 612, if administering user 124 does not confirm ergonomic compatibility of each ergonomic requirement item of each learning infrastructure item to be set up for the chosen learning applications at the learning facility 132, the inputs are received by the ergonomic requirements compatibility database 430, and an administrator of the modular learning system 144 is not requested to visit facility 132. The interface generator 434 then accesses the generated ergonomic incompatibility items and corresponding learning facility purchase items from the ergonomic requirements database 430 and displays the same to receive updated preferences of learning infrastructure purchase items and corresponding ergonomic compatibility from user 124 through a learning facility ergonomic compatibility interface generated by generator 434 and displayed on user 124's user device 140.

At step 614, if administering user 124 confirms ergonomic compatibility of each learning infrastructure purchase item's ergonomic requirements to the prospective facility 132 through confirmation preferences chosen for each learning infrastructure purchase item on the interface generated by generator 434, a site visit scheduling module accesses the ergonomic compatibility items from the ergonomic requirements database 430, generates a unique site visit scheduling item, and display the same on a user device to an administrator of the modular learning system 144. Upon confirmation of the scheduled date and time of the site visit, interface generator 434 displays a corresponding site visit schedule confirmation interface item to user 124 through a learning facility management interface generated by interface generator 434 and displayed on user 124's user device 140.

At step 616, upon completion of the site visit by an administrator of the modular learning system 144 at the scheduled date and time indicated in the corresponding interface item, a site visit compatibility items database 414 receives the compatibility status of the prospective facility 132 with the learning infrastructure purchase item to be set up by user 124 at the facility, from inputs received through a site visit compatibility interface generated by interface generator 434 and displayed on a user device to the corresponding administrator of the modular learning system 144.

At step 618, if the administrator of the modular learning system 144 denies learning facility approval to prospective facility 132 due to ergonomic incompatibility or other qualitative factors, the corresponding compatibility report and 'Setup Request Denied' interface item are generated by generator 434 and displayed through a learning facility management interface, to learning facility administering user 124 on the user's user device 140. At step 620, if the prospective learning facility 132 is approved by the corresponding administrator of the modular learning system 144 after the site visit, the compatibility report and corresponding 'Learning Facility Approved' interface item is generated by interface generator 434 and displayed through a learning facility management interface on user 124's user device 140. In one embodiment, the modular learning facility management module 242 grants the learning infrastructure purchase request for the chosen learning infrastructure purchase items by processing the transaction or forwarding the purchase request of user 124 to the corresponding learning infrastructure providers on, or optionally, outside modular learning system 144. In some embodiments, a corresponding purchase confirmation item may be generated or received by an items purchase confirmation module in modular learning facility management module 242.

At step 622, after each learning infrastructure purchase item has been set up at the facility 132, the facility management module 242 receives a unique confirmation item for each learning infrastructure purchase item setup at facility 132 from a confirmation input chosen by user 124 for each such learning infrastructure item, through an interface with corresponding input areas for each learning infrastructure purchase item, generated by generator 434 and displayed on user 124's user device 140.

At step 624, learning facility management module 242 authorizes access to restricted learning facility management interfaces like purchase analytics, performance analytics, or the learning stream of the learning facility generated by interface generator 434 to administering user 124. At step 626, the learning facility availability module 426 updates the learning facility's accessibility and the corresponding availability of the chosen learning applications at the learning facility in the learning facility database 230 and updates the learning facility metadata 316 of each chosen learning application 300, to display compatibility of the learning facility 132 with each such learning application 300, when the learning application is requested to be performed by any of the plurality of learning users in user database 202.

Although the method to set up a modular learning facility through a modular learning system is described as being composed of various steps, fewer or more steps (e.g., Receive Microlearning Sale Items Preferences For Application Services From Administering User, Generate Recommended Learning Infrastructure For Chosen Learning Applications Or Subjects, Process Learning Infrastructure Purchase Request) may comprise the method with the configuration still falling within the scope of various embodiments.

Figure 7:
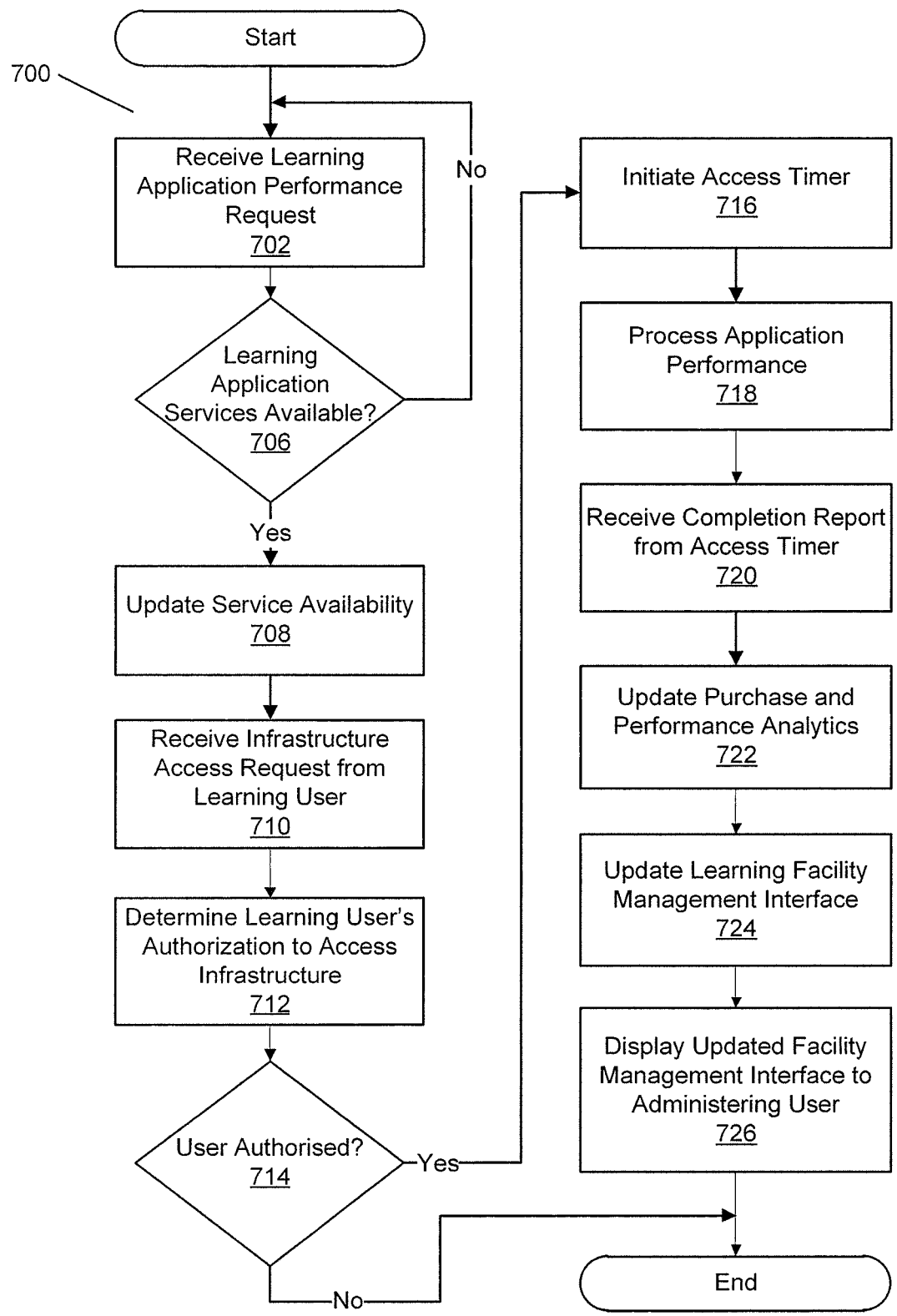
FIG. 7 is a flow diagram of a method for managing learning facility access in a modular learning system environment 700 according to one embodiment.

FIG. 7 is a flow diagram of a method for managing learning facility access in a modular learning system environment. At step 702, the learning facility management module 242 receives a learning application performance request from a learning user 102 via microlearning performance management module 240, through a learning facility access interface generated by interface generator 434 and displayed on the user 102's user device 140. In an embodiment, receiving the learning application performance request comprises receiving check-in credentials.

At step 706, the service availability module 424 determines the learning facility access availability for the learning performance request by accessing the login and check-in items of the same in microlearning performance management module 240. If the service availability module 424 indicates that learning infrastructure access of the learning application's performance is not immediately available, the interface generator 434 may not proceed to grant learning infrastructure access to learning users. At step 708, if the learning infrastructure for the learning application performance request is immediately available, the service availability module 424 updates the infrastructure's unavailability to other learning users requesting or scheduled to request access to the learning infrastructure for their respective application performances.

At step 710, the authorized user device 140 receives a learning infrastructure access request from one or more users scheduled to perform or monitor the performance of the requested learning applications at the facility. The users may be learning users 102 or tutoring users 112, depending on the mode metadata 324 of each learning application 300 and, in case of multiple authorized modes, the mode preferences of each such set of users. The request is received through a learning performance interface and, optionally, a tutoring service interface generated by a learning interface module and, optionally, a tutoring interface module in the modular learning system 144. At step 712, the microlearning performance management module 240 requests the service availability module 424 and, in case of prepaid access to the learning station, also requests the microlearning purchase management module 238 to determine authorization to access the learning infrastructure at a learning station or learning performance area.

At step 714, the service availability module 424 determines authorization to access the learning infrastructure based on the confirmed service availability, as well as by accessing any performance booking items or prepaid access items from modules 240 and 238 respectively. If the requesting user or set of users are not authorized to access the learning infrastructure, the service availability module 424 does not request the timing module 432 to initiate the access timer, and the microlearning performance management module 240 does not receive a request to process the learning application performance.

At step 716, if the requesting user or set of users are authorized to access the learning infrastructure for the performance at a given learning station or performance area in learning facility 132, the service availability module 424 requests the timing module 432 to initiate an access timer and requests the microlearning performance management module 240 to process the learning application performance. At step 718, the microlearning performance management module 240 processes the preview, performance, and review of the requested learning application and requests a learning interface module and, optionally, tutoring interface module in the modular learning system 144 to generate and display a corresponding preview, performance, and review interface to the corresponding user or set of users at the learning station or performance area on an authorized user device 140 at the learning station or performance area of learning facility 124.

At step 720, after the completion of the learning application performance, the performance management module 240 receives a performance completion input from the performing learning user, the learning facility administering user, the duration metadata 310 of the learning application 300 or, optionally, the tutoring user 112, and generates and sends a performance completion report to the timing module 432 which then pauses or stops the access timer. If a plurality of learning applications are scheduled to be performed using the same learning infrastructure in the same performing area by the same requesting user or set of requesting users, the timing module 432 may stop the access timer after the performance of the plurality of learning applications upon the receiving the performance completion reports for all the learning applications from module 240. Alternatively, if the learning application is requested to be performed a second time by the requesting user using the same learning infrastructure at the same learning station or performance area, and the service availability of the performance request is confirmed by the service availability module 424, the timing module 432 may pause or stop the access timer after the completion of the second requested performance of the learning application by the requesting user. If the next learning application is scheduled or requested to be performed by the requesting user using different learning infrastructure at a different learning station or performance area within the same learning facility, the timing module 432 may pause or stop the access timer after the completion of all such learning applications at each such learning station or performance area in one accessed session to the learning facility 132 by the requesting user.

At step 722, the microlearning purchase management module 238 updates the purchase analytics module 406 with a plurality of purchase analytics items for the unique learning facility access purchase item generated for the learning facility access provided to the requesting user or set of requesting users for the performance of each learning application. In some embodiments, the microlearning purchase management module 238 may access the access times recorded by the timing module 432 or, optionally, the number of learning application performances processed by the performance management module 240 to generate the learning facility access purchase item and corresponding purchase analytics item, depending on the price per unit of time or price per learning application performance as chosen or filled in by the learning facility administering user 124 for each learning infrastructure 502 and stored in the learner sale items module 428. Further, the microlearning performance management module 240 updates the performance analytics module 408 with a plurality of performance analysis items and, optionally, recording, measurement, scoring or, optionally, review items generated or received during the learning application performance using the learning infrastructure at the learning facility. In some embodiments, the corresponding performance items of each learning user's application performances in the learning facility may be received and stored without the learning user's corresponding identity items based on performance privacy preferences of the learning user or, optionally, a plurality of learning users.

At step 724, the interface generator 434 accesses the purchase analytics items and performance analytics items and generates the corresponding updated analytics interface items for the learning facility. At step 726, the interface generator 434 displays the updated learning facility management interface to administering user 124 with a predetermined or preferred plurality of interface items including, in some embodiments, analytics interface items generated in the previous step, and displays the same to the administering user 124 on user 124's user device 140.

Although the method for managing learning facilities in a modular learning system environment is described as being composed of various steps, fewer or more steps (e.g., Receive Learning Facility Management Interface Display Preferences of Administering User) may comprise the method with the configuration still falling within the scope of various embodiments.

In an embodiment, the invention provides an apparatus comprising a processor configured to execute instructions stored on a non-transitory medium and a non-volatile memory including instructions for execution on the processor.

Computing Machine Architecture

Figure 8:
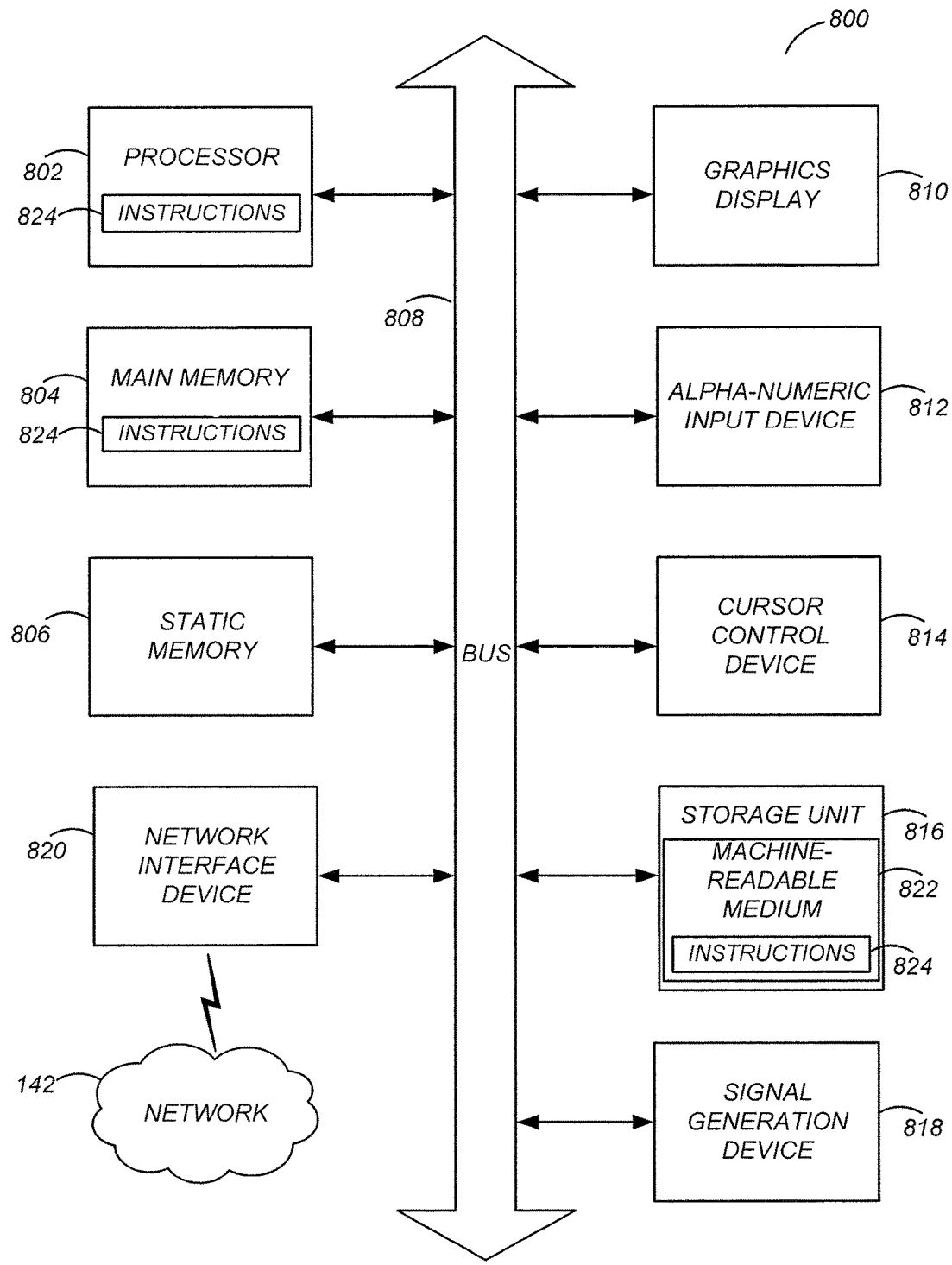
FIG. 8 illustrates components of an example machine 800 able to read instructions from a machine-readable medium and execute them in a processor (or controller) according to one embodiment.

FIG. 8 is a block diagram illustrating components of an example machine suitable for use as a modular learning system 144 (e.g., as described in association with FIGS. 1-7), in which any of the embodiments disclosed herein may be performed, according to one embodiment. This example machine is able to read instructions from a machine-readable medium and execute them in a processor (or controller).

Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include a graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 142 via the network interface device 820.

While machine readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

The modular learning system 144 may be one or more servers in which one or more methods disclosed herein are performed. The processor 802 may be a microprocessor, a state machine, an application specific integrated circuit, a field programmable gate array, etc. (e.g., Intel® Pentium® processor). The main memory 804 may be a dynamic random access memory and/or a primary memory of the modular learning system 144. The static memory 806 may be a hard drive, a flash drive, and/or other memory information associated with the modular learning system 144.

The bus 808 may be an interconnection between various circuits and/or structures of the modular learning system 144. The video display 810 may provide graphical representation of information on the modular learning system 144. The alphanumeric input device 812 may be a keypad, keyboard and/or any other input device. The cursor control device 814 may be a pointing device such as a mouse.

The storage unit 816 may be a hard drive, a storage system, and/or other longer term storage subsystem. The signal generation device 818 may be a bios and/or a functional operating system of the modular learning system 144. The network interface device 820 may be a device that may perform interface functions such as code conversion, protocol conversion and/or buffering required for communication to and from a network (e.g., the network 142 of FIG. 1). The machine readable medium 822 may provide instructions 824 on which any of the methods disclosed herein may be performed. The instructions 824 may provide source code and/or data code to the processor 802 to enable any one/or more operations disclosed herein. For example, the modular learning system 144 may be stored in the form of instructions 824 on a storage medium such as the main memory 804 and/or the machine readable medium 822 such as compact disk.

In one embodiment, a non-transitory computer-readable storage medium having a program executable by a computing device (e.g., the modular learning system 144) causes the computing device to perform method steps illustrated in FIG. 6 and FIG. 7.

Additional Configuration Considerations

Thus, the learning facility management module 242 enables the modular learning system 144 to manage learning facilities and learning applications for performance at learning facilities. As an example, a learning facility may register with a learning application that the learning facility has three stages available for use to perform plays, dancing lessons, skits, comedy, and other performance arts. The learning facility registers these stages as learning infrastructures and associates the stages with appropriate performance arts learning applications. Users may purchase time on various stages and go to the learning facility to access the stage. The access of the learning user to the appropriate stage is controlled by an access control point that requires the user to submit verification information demonstrating the user is entitled to use the stage at the time the user is at the facility. The access control point may grant such access and the user may proceed to the stage for learning the selected learning application. As the user is at the stage, a user device (e.g., a tablet computing device or personal computer with sufficiently sized display) is available at the learning facility to display instructions from the modular learning system regarding the performance and lesson of the learning application. In addition, the user device can be used to input information about the user's performance, which can be transferred to the modular learning system.

In one embodiment, if the necessary infrastructure for a learning application is not available at a given learning facility, microlearning event management module 242 may determine equivalent facilities that have the necessary infrastructure available and recommend the available facilities to the administering user. The event management module 242 may narrow the list of alternative facilities by recommending facilities that are close to the original facility (e.g., less than five kilometers away), are highly rated by users, have a cost that is less than or equal to the cost of the original facility, etc.

Throughout this specification, plural instances may implement modules, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate modules in example configurations may be implemented as a combined structure or module. Similarly, structures and functionality presented as a single module may be implemented as separate modules. These and other variations, modifications, additions, and improvements fall within the scope of the subject matter herein.

Certain embodiments are described herein as including functionality implemented in computing logic or a number of modules, engines, or mechanisms, for example, as illustrated in FIGS. 2 and 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

In another embodiment, the microlearning purchase and performance interface provided by the modular learning system 144 can be accessed over a local area network, intranet or virtual private network accessible to a limited plurality of user devices at a preschool, school, college, university, educational board, professional standards authority, coaching class, a company, HR department, training department or at a training organization through a user device.

In another embodiment, the microlearning purchase and performance interface provided by the modular learning system 144 can be accessed over a wide area network, General Packet Radio Service network, an Enhanced Data for Global Evolution network, a 3G telecommunications network, a 4G LTE telecommunications network or other telecommunications network through a user device.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although the present embodiments have been described with reference to specific example embodiments, it will be evident that various modifications and changes may be made to these embodiments without departing from the broader spirit and scope of the various embodiments. For example, the various devices, modules, databases, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine modules that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and modules of the embodiments herein. This is done merely for convenience and to give a general sense of the invention. This description should be read to include one or at least one and the singular also includes the plural unless it is obvious that it is meant otherwise.

According to the embodiments described in FIG. 1 through 7, various methods and electric structures may be embodied using transistors, logic gates, and electrical circuits (e.g., Application Specific Integrated Circuitry and/or in Digital Signal Processor circuitry). For example, the purchase management module 238, performance management module 240 and other modules of FIGS. 1 to 7 may be enabled using a purchase management circuit, a performance management circuit, and other circuits using one or more of the technologies described herein. In addition, it will be appreciated that the various operations, processes, and methods disclosed herein may be embodied in a machine-readable medium and/or a machine accessible medium compatible with a data processing system (e.g., a server) and may be performed in any order. Accordingly, the specification and drawings are to be regarded in an illustrative rather than a restrictive sense.

Upon reading this disclosure, those of skill in the art will appreciate still additional alternative structural and functional designs for a system and a process for managing the purchase and performance of learning applications and associated application services in a microlearning stack through the disclosed principles herein. Thus, while particular embodiments and applications have been illustrated and described, it is to be understood that the disclosed embodiments are not limited to the precise construction and modules disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for managing learning facilities in a modular learning system comprising:
    maintaining, by the modular learning system, a learning facility database configured for storing a plurality of data fields of including a plurality of learning facilities as received from a plurality of learning facility administering users, wherein each learning facility is associated with a learning infrastructure;

maintaining a learning application database including a plurality of learning applications, each learning application having a subject, each learning application operable for performance by a learning user to learn the subject and each learning application associated with ergonomic requirements;

receiving, by a learning facility management module, a learning facility setup request from a learning facility administering user through an interface generated by a modular learning facility management interface generator on a user device, specifying, by a learning facility recommendation generator, the learning facility in the plurality of learning facilities and at least one learning application to be performed at the learning facility;

displaying, by the learning facility management module, at least one learning application by accessing the at least one learning application from the learning application database through an interface generated by the learning facility recommendation generator;

accessing, by the learner facility recommendation generator, an ergonomic requirements compatibility database, to retrieve one or more ergonomic requirement items of the at least one learning application at the learning facility and display the one or more ergonomic requirement items to the administering user through a learning facility ergonomic management interface;

displaying ergonomic requirements to the administering user through a learning facility ergonomic compatibility confirmation interface generated by the learning facility interface generator;

determining, by an infrastructure recommendation generator, a compatibility of a learning infrastructure associated with the learning facility with the ergonomic requirements of the learning infrastructure associated with the at least one learning application;

scheduling, by a site visit scheduling module, a site visit or a physical check if an ergonomic compatibility is confirmed;

receiving, by a site visit compatibility items database, a compatibility status of a prospective learning facility with a learning infrastructure purchase item set up by the administering user at the learning facility from inputs received through a site visit compatibility interface generated by the infrastructure recommendation interface generator;

receiving, by the learning facility management module, from a user device operated by the learning user, a request to perform the at least one learning application; and authorizing, by an access control module, the request to perform the at least one learning application, wherein the request to perform the at least one learning application comprises user credentials; and granting, by the access control module, the learning user physical access to the learning facility having the associated learning infrastructure compatible with the ergonomic requirements associated with the at least one learning application.

2. The method of claim 1, further comprising:
maintaining a learning application database including a plurality of learning applications, each learning application associated with a learning infrastructure;

receiving, by the learning facility management module, a learning application performance request from the learning user specifying the learning application in the plurality of learning applications through a learning facility access interface generated by the interface generator;

verifying, by a service availability module, if the learning application services are available or not;

updating, by the service availability module, the service availability if the one or more learning application services are available;

receiving, by an authorized user device, a learning infrastructure access request from one or more users scheduled to perform or monitor the performance of the requested learning applications at the learning facility;

requesting, by a microlearning performance management module, to a service availability module to determine authorization of a learning user to access the learning infrastructure;

determining, by a service availability module, authorization to access to the learning infrastructure associated with the learning application;

initiating, by a timing module, an access timer after authorizing access if the requesting user or set of users are authorized to access the learning infrastructure;

processing the application performance;

receiving, by a performance management module, a performance completion input from the learning user, the learning facility administering user, and the duration metadata of the learning application, wherein the performance management module generates and sends a performance completion report to a timing module;

updating, by a microlearning purchase management module, a purchase analytics module with a plurality of purchase analytics items for the unique learning facility access purchase item generated for the learning facility access provided to the requesting user or set of requesting users for the performance of each learning application;

generating, by an interface generator, an updated analytics interface items for the learning facility through a learning facility management interface; and displaying, by the interface generator, the updated learning facility management interface to the administering user.

3. The method of claim 2, wherein the learning application performance request is received from a user device operated by at least one of a learning user and a tutoring user.

4. The method of claim 2, wherein the learning application performance request comprises a purchase item indicating the purchase of the learning application.

5. The method of claim 2, wherein receiving the learning application performance request comprises receiving check-in credentials from an access control point; and
wherein authorizing access comprises authorizing check-in credentials.

* * * * *